United States Patent
Sengupta et al.

(10) Patent No.: US 12,414,163 B2
(45) Date of Patent: Sep. 9, 2025

(54) CLOSED LOOP TIME AND FREQUENCY CORRECTIONS IN NON-TERRESTRIAL NETWORKS

(71) Applicant: QUALCOMM Incorporated, San Diego, CA (US)

(72) Inventors: Ayan Sengupta, San Diego, CA (US); Alberto Rico Alvarino, San Diego, CA (US); Xiao Feng Wang, San Diego, CA (US); Liangping Ma, San Diego, CA (US); Umesh Phuyal, San Diego, CA (US); Le Liu, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 564 days.

(21) Appl. No.: 17/733,636

(22) Filed: Apr. 29, 2022

(65) Prior Publication Data

US 2023/0354441 A1 Nov. 2, 2023

(51) Int. Cl.
*H04W 74/0833* (2024.01)
*H04W 72/0446* (2023.01)
(Continued)

(52) U.S. Cl.
CPC ... *H04W 74/0841* (2013.01); *H04W 72/0446* (2013.01); *H04W 72/0453* (2013.01); *H04W 74/0866* (2013.01); *H04W 84/06* (2013.01)

(58) Field of Classification Search
None
See application file for complete search history.

(56) References Cited

U.S. PATENT DOCUMENTS

| 2022/0159741 A1* | 5/2022 | Hoang | H04W 74/0833 |
| 2022/0264636 A1* | 8/2022 | Wang | H04W 74/002 |

(Continued)

FOREIGN PATENT DOCUMENTS

| WO | WO-2021027346 A1 * | 2/2021 | H04B 7/1851 |
| WO | WO-2021032453 A1 * | 2/2021 | H04B 7/18504 |

(Continued)

OTHER PUBLICATIONS

Huawei, "Discussion on Timing Advance and RACH for NTN", May 2019, doc code-R1-1905994. (Year: 2019).*

(Continued)

*Primary Examiner* — Jamaal Henson
(74) *Attorney, Agent, or Firm* — Holland & Hart LLP

(57) ABSTRACT

Methods, systems, and devices for wireless communications are described. Described techniques provide for mitigating error in time or frequency adjustments for preambles of a random access procedure. A user equipment may use one value for the adjustment when transmitting data to a non-terrestrial network, but then transmit the preamble of a random access procedure according to a preamble-specific time or frequency adjustment based on one or more indications received from the network (e.g., rather than resetting the adjustment to "0"). By using some signaled value for the preamble-specific timing or frequency adjustment rather than resetting the adjustment to "0," preamble reception performance may be maintained or improved with as many or fewer position measurements for the UE or non-terrestrial network entity.

30 Claims, 18 Drawing Sheets

(51) Int. Cl.
*H04W 72/0453* (2023.01)
*H04W 74/08* (2009.01)
*H04W 84/06* (2009.01)

(56) References Cited

U.S. PATENT DOCUMENTS

| | | | | |
|---|---|---|---|---|
| 2022/0286198 | A1* | 9/2022 | Khan | H04W 56/0045 |
| 2022/0330187 | A1* | 10/2022 | Cheng | H04W 56/004 |
| 2023/0010343 | A1 | 1/2023 | Li | |
| 2023/0180306 | A1* | 6/2023 | Lin | H04W 76/11 |
| | | | | 370/329 |
| 2023/0189088 | A1 | 6/2023 | Shin et al. | |
| 2023/0345399 | A1* | 10/2023 | Hu | H04W 56/0045 |
| 2024/0155536 | A1* | 5/2024 | Zhang | H04W 64/00 |
| 2024/0259088 | A1* | 8/2024 | Rune | H04B 7/18532 |
| 2024/0292361 | A1* | 8/2024 | Wigard | H04B 7/18513 |

FOREIGN PATENT DOCUMENTS

| | | |
|---|---|---|
| WO | WO-2021088674 A1 | 5/2021 |
| WO | WO-2021189183 A1 | 9/2021 |
| WO | WO-2022030851 A1 | 2/2022 |
| WO | WO-2022175872 A1 | 8/2022 |
| WO | WO-2023052805 A1 | 4/2023 |

OTHER PUBLICATIONS

International Search Report and Written Opinion—PCT/US2023/019735—ISA/EPO—Aug. 4, 2023.

* cited by examiner

CLOSED LOOP TIME AND FREQUENCY CORRECTIONS IN NON-TERRESTRIAL NETWORKS

FIELD OF TECHNOLOGY

The following relates to wireless communications, including closed loop time and frequency corrections in non-terrestrial networks.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support closed loop time and frequency corrections in non-terrestrial networks (NTNs). For example, the described techniques provide for mitigating error in time or frequency adjustments for preambles of a random access procedure. A user equipment (UE) may use one value for the adjustment when transmitting data to an NTN, but then transmit the preamble of a random access procedure according to a preamble-specific time or frequency adjustment based on one or more indications received from the network (e.g., rather than resetting the adjustment to "0"). By using some signaled value for the preamble-specific timing or frequency adjustment rather than resetting the adjustment to "0," preamble reception performance may be maintained or improved with as many or fewer position measurements for the UE or non-terrestrial network entity (e.g., satellite).

A method for wireless communications at a UE is described. The method may include establishing a communication session with a network via a non-terrestrial network entity, receiving, from the non-terrestrial network entity, control signaling identifying a preamble-specific time or frequency adjustment applicable to a transmission of a preamble of a random access procedure to be performed during the communication session, and transmitting, to the network during the communication session, the preamble of the random access procedure according to a total time or frequency adjustment value that is based on the preamble-specific time or frequency adjustment.

An apparatus for wireless communications at a UE is described. The apparatus may include a processor, memory coupled with the processor, and instructions stored in the memory. The instructions may be executable by the processor to cause the apparatus to establish a communication session with a network via a non-terrestrial network entity, receive, from the non-terrestrial network entity, control signaling identifying a preamble-specific time or frequency adjustment applicable to a transmission of a preamble of a random access procedure to be performed during the communication session, and transmit, to the network during the communication session, the preamble of the random access procedure according to a total time or frequency adjustment value that is based on the preamble-specific time or frequency adjustment.

Another apparatus for wireless communications at a UE is described. The apparatus may include means for establishing a communication session with a network via a non-terrestrial network entity, means for receiving, from the non-terrestrial network entity, control signaling identifying a preamble-specific time or frequency adjustment applicable to a transmission of a preamble of a random access procedure to be performed during the communication session, and means for transmitting, to the network during the communication session, the preamble of the random access procedure according to a total time or frequency adjustment value that is based on the preamble-specific time or frequency adjustment.

A non-transitory computer-readable medium storing code for wireless communications at a UE is described. The code may include instructions executable by a processor to establish a communication session with a network via a non-terrestrial network entity, receive, from the non-terrestrial network entity, control signaling identifying a preamble-specific time or frequency adjustment applicable to a transmission of a preamble of a random access procedure to be performed during the communication session, and transmit, to the network during the communication session, the preamble of the random access procedure according to a total time or frequency adjustment value that is based on the preamble-specific time or frequency adjustment.

In some examples of the method, apparatuses, and non-transitory computer-readable medium described herein, receiving the control signaling identifying the preamble-specific time or frequency adjustment may include operations, features, means, or instructions for receiving a control message indicating an explicit time or frequency adjustment value, where the preamble-specific time or frequency adjustment may be based on the explicit time or frequency adjustment value.

In some examples of the method, apparatuses, and non-transitory computer-readable medium described herein, receiving the control signaling identifying the preamble-specific time or frequency adjustment may include operations, features, means, or instructions for receiving, before transmitting the preamble, one or more time or frequency adjustment commands indicating one or more respective time or frequency adjustment values and determining the preamble-specific time or frequency adjustment based on an accumulation of the one or more respective time or frequency adjustment values.

Some examples of the method, apparatuses, and non-transitory computer-readable medium described herein may further include operations, features, means, or instructions for resetting the accumulation of the one or more respective time or frequency adjustment values to zero based on updated position information associated with the UE from a satellite positioning network, updated ephemeris information associated with the non-terrestrial network entity, or both.

Some examples of the method, apparatuses, and non-transitory computer-readable medium described herein may further include operations, features, means, or instructions for identifying a time or frequency adjustment parameter based on a first position of the UE and a second position of the non-terrestrial network entity, where the preamble-specific time or frequency adjustment may be determined based on the time or frequency adjustment parameter and the accumulation.

In some examples of the method, apparatuses, and non-transitory computer-readable medium described herein, the total time or frequency adjustment value includes a first time or frequency adjustment parameter that may have a range of potential values based on zero or more time or frequency adjustment commands received from the non-terrestrial network entity and a second time or frequency adjustment parameter based on a first position of the UE and a second position of the non-terrestrial network entity, and the control signaling identifying the preamble-specific time or frequency adjustment includes the first time or frequency adjustment parameter, the second time or frequency adjustment parameter, or any combination thereof.

In some examples of the method, apparatuses, and non-transitory computer-readable medium described herein, the total time or frequency adjustment value may be based on a first time or frequency adjustment parameter that may have a range of potential values based on zero or more time or frequency adjustment commands received from the non-terrestrial network entity prior to transmitting the preamble, a second time or frequency adjustment parameter based on a first position of the UE and a second position of the non-terrestrial network entity, and the preamble-specific time or frequency adjustment.

In some examples of the method, apparatuses, and non-transitory computer-readable medium described herein, receiving the control signaling identifying the preamble-specific time or frequency adjustment for the time or frequency adjustment may include operations, features, means, or instructions for receiving, before transmitting the preamble, a random access response message indicating a time or frequency adjustment parameter and determining the preamble-specific time or frequency adjustment based on the time or frequency adjustment parameter.

Some examples of the method, apparatuses, and non-transitory computer-readable medium described herein may further include operations, features, means, or instructions for receiving control signaling indicating at least one of a first parameter identifying a timing or frequency adjustment offset or a second parameter identifying a timing or frequency adjustment for communications between a ground station and the non-terrestrial network entity, where the total time or frequency adjustment value includes a total timing or frequency adjustment value that may be based on the first parameter, the second parameter, and the preamble-specific time or frequency adjustment.

In some examples of the method, apparatuses, and non-transitory computer-readable medium described herein, receiving the control signaling identifying the preamble-specific time or frequency adjustment for the time or frequency adjustment may include operations, features, means, or instructions for receiving the control signaling identifying the preamble-specific time or frequency adjustment via a medium access control (MAC) control element (CE).

Some examples of the method, apparatuses, and non-transitory computer-readable medium described herein may further include operations, features, means, or instructions for receiving a control message indicating for the UE to perform the random access procedure, where the preamble of the random access procedure may be transmitted at least in part in response to the received control message.

Some examples of the method, apparatuses, and non-transitory computer-readable medium described herein may further include operations, features, means, or instructions for receiving, from the network via the non-terrestrial network entity and after transmitting the preamble, control signaling indicating for the UE to acquire updated position information for the UE from a satellite positioning network, indicating for the UE to acquire updated ephemeris information associated with the non-terrestrial network entity, or both.

Some examples of the method, apparatuses, and non-transitory computer-readable medium described herein may further include operations, features, means, or instructions for acquiring updated position information for the UE from a satellite positioning network, updated ephemeris information associated with the non-terrestrial network entity, or both, based on the UE failing to receive a response to the transmitted preamble or one or more retransmissions of the preamble.

In some examples of the method, apparatuses, and non-transitory computer-readable medium described herein, a satellite includes the non-terrestrial network entity.

A method for wireless communications at a network entity is described. The method may include establishing a communication session with a UE via a non-terrestrial network entity, outputting, to the UE, control signaling identifying a preamble-specific time or frequency adjustment applicable to a transmission of a preamble of a random access procedure to be performed during the communication session, and receiving, from the UE during the communication session, the preamble of the random access procedure according to a total time or frequency adjustment value that is based on the preamble-specific time or frequency adjustment.

An apparatus for wireless communications at a network entity is described. The apparatus may include a processor, memory coupled with the processor, and instructions stored in the memory. The instructions may be executable by the processor to cause the apparatus to establish a communication session with a UE via a non-terrestrial network entity, output, to the UE, control signaling identifying a preamble-specific time or frequency adjustment applicable to a transmission of a preamble of a random access procedure to be performed during the communication session, and receive, from the UE during the communication session, the preamble of the random access procedure according to a total time or frequency adjustment value that is based on the preamble-specific time or frequency adjustment.

Another apparatus for wireless communications at a network entity is described. The apparatus may include means for establishing a communication session with a UE via a non-terrestrial network entity, means for outputting, to the UE, control signaling identifying a preamble-specific time or frequency adjustment applicable to a transmission of a preamble of a random access procedure to be performed during the communication session, and means for receiving, from the UE during the communication session, the preamble of the random access procedure according to a total time or frequency adjustment value that is based on the preamble-specific time or frequency adjustment.

A non-transitory computer-readable medium storing code for wireless communications at a network entity is described. The code may include instructions executable by a processor to establish a communication session with a UE via a non-terrestrial network entity, output, to the UE, control signaling identifying a preamble-specific time or frequency adjustment applicable to a transmission of a preamble of a random access procedure to be performed during the communication session, and receive, from the UE during the communication session, the preamble of the random access procedure according to a total time or frequency adjustment value that is based on the preamble-specific time or frequency adjustment.

In some examples of the method, apparatuses, and non-transitory computer-readable medium described herein, outputting the preamble-specific time or frequency adjustment for the time or frequency adjustment may include operations, features, means, or instructions for outputting a control message indicating an explicit time or frequency adjustment value, where the preamble-specific time or frequency adjustment may be based on the explicit time or frequency adjustment value.

In some examples of the method, apparatuses, and non-transitory computer-readable medium described herein, outputting the control signaling identifying the preamble-specific time or frequency adjustment for the time or frequency adjustment may include operations, features, means, or instructions for outputting, before receiving the preamble, one or more time or frequency adjustment commands indicating one or more respective time or frequency adjustment values, where the preamble-specific time or frequency adjustment may be based on an accumulation of the one or more respective time or frequency adjustment values.

Some examples of the method, apparatuses, and non-transitory computer-readable medium described herein may further include operations, features, means, or instructions for identifying a time or frequency adjustment parameter based on a first position of the UE and a second position of the non-terrestrial network entity, where the preamble-specific time or frequency adjustment may be determined based on the time or frequency adjustment parameter and the accumulation.

In some examples of the method, apparatuses, and non-transitory computer-readable medium described herein, the total time or frequency adjustment value includes a first time or frequency adjustment parameter that may have a range of potential values based on zero or more time or frequency adjustment commands output to the UE via the non-terrestrial network entity and a second time or frequency adjustment parameter based on a first position of the UE and a second position of the non-terrestrial network entity, and the preamble-specific time or frequency adjustment includes the first time or frequency adjustment parameter, the second time or frequency adjustment parameter, or any combination thereof.

In some examples of the method, apparatuses, and non-transitory computer-readable medium described herein, the total time or frequency adjustment value may be based on a first time or frequency adjustment parameter that may have a range of potential values based on zero or more time or frequency adjustment commands output to the UE via the non-terrestrial network entity prior to receiving the preamble, a second time or frequency adjustment parameter based on a first position of the UE and a second position of the non-terrestrial network entity, and the preamble-specific time or frequency adjustment.

In some examples of the method, apparatuses, and non-transitory computer-readable medium described herein, outputting the control signaling identifying the preamble-specific time or frequency adjustment for the time or frequency adjustment may include operations, features, means, or instructions for outputting, before receiving the preamble, a random access response message indicating a time or frequency adjustment parameter, where the preamble-specific time or frequency adjustment may be based on the time or frequency adjustment parameter.

Some examples of the method, apparatuses, and non-transitory computer-readable medium described herein may further include operations, features, means, or instructions for outputting, to the UE via the non-terrestrial network entity, control signaling indicating at least one of a first parameter identifying a timing or frequency adjustment offset or a second parameter identifying a timing or frequency adjustment for communications between a ground station and the non-terrestrial network entity, where the total time or frequency adjustment value includes a total timing or frequency adjustment value that may be based on the first parameter, the second parameter, and the preamble-specific time or frequency adjustment.

In some examples of the method, apparatuses, and non-transitory computer-readable medium described herein, outputting the control signaling identifying the preamble-specific time or frequency adjustment for the time or frequency adjustment may include operations, features, means, or instructions for outputting the control signaling identifying the preamble-specific time or frequency adjustment via a MAC-CE.

Some examples of the method, apparatuses, and non-transitory computer-readable medium described herein may further include operations, features, means, or instructions for outputting a control message indicating for the UE to perform the random access procedure, where the preamble of the random access procedure may be received at least in part in response to the output control message.

Some examples of the method, apparatuses, and non-transitory computer-readable medium described herein may further include operations, features, means, or instructions for outputting, to the UE after receiving the preamble, control signaling indicating for the UE to acquire updated position information for the UE from a satellite positioning network, indicating for the UE to acquire updated ephemeris information associated with the non-terrestrial network entity, or both.

In some examples of the method, apparatuses, and non-transitory computer-readable medium described herein, a satellite includes the non-terrestrial network entity, the network entity includes the non-terrestrial network entity, a ground station includes the network entity, or any combination thereof.

DETAILED DESCRIPTION

Figure 1:
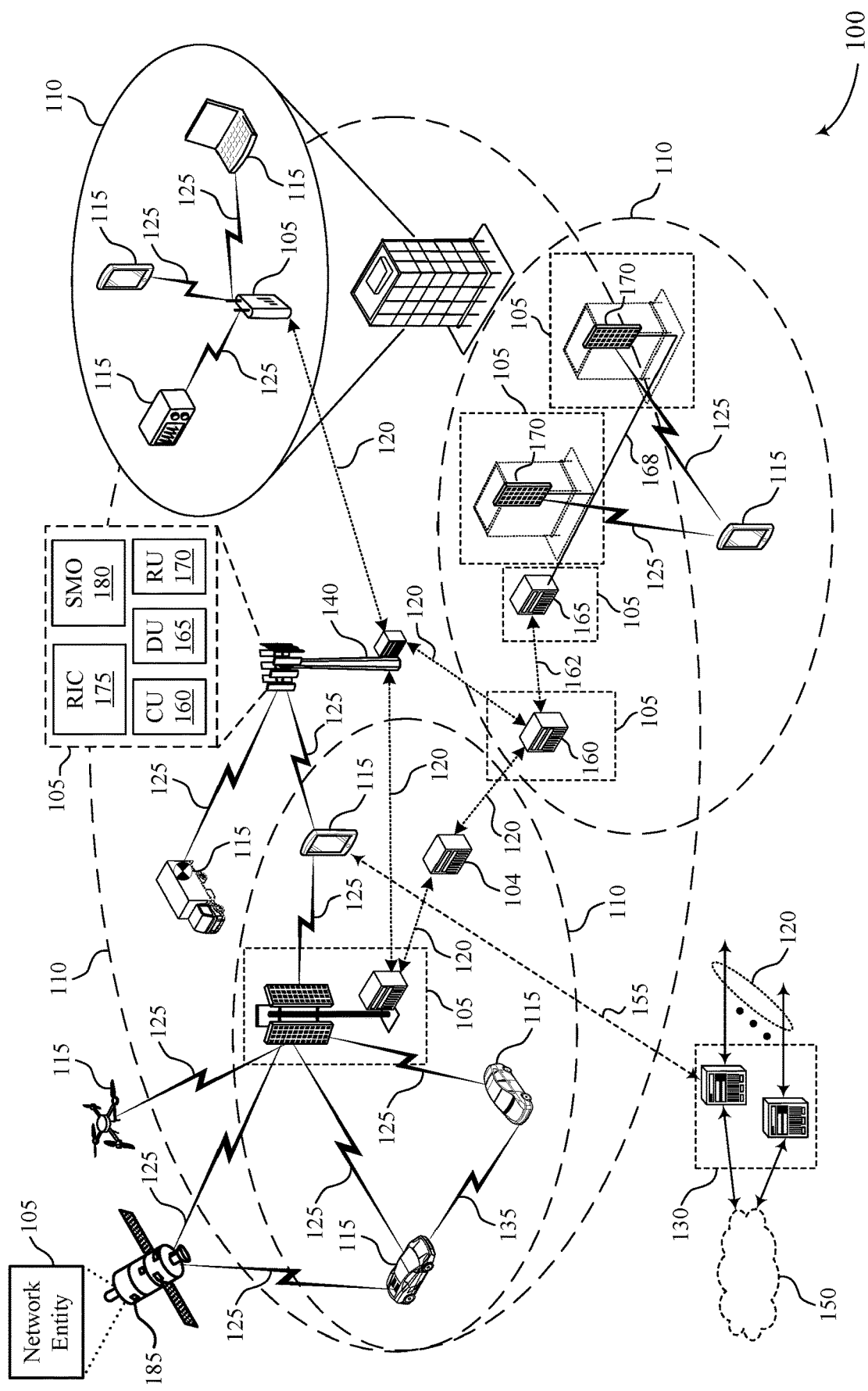
FIG. 1 illustrates an example of a wireless communications system that supports closed loop time and frequency corrections in non-terrestrial networks in accordance with one or more aspects of the present disclosure.

Wireless communications systems may include non-terrestrial networks (NTNs), which may include networks based on satellites (e.g., low-earth orbit (LEO) wireless communications system or a geosynchronous equatorial orbit (GEO) wireless communications system), unmanned aerial vehicles, aircraft, or balloons. A user equipment (UE) may communicate with an NTN. A UE may calculate a timing adjustment (e.g., a timing advance) or a frequency adjustment for uplink transmissions to a non-terrestrial network entity (e.g., a network entity located on a satellite, an unmanned aerial vehicle, an aircraft, or a balloon). A timing advance refers to a timing offset or correction applied to uplink frames with respect to corresponding downlink frames. Similarly, a frequency adjustment refers to a frequency offset or correction applied to uplink frames with respect to corresponding downlink frames.

A total timing adjustment that a UE uses may be based on multiple adjustment values. For example, Equation 1 below indicates a total timing advance $T_{TA}$ a UE may apply to an uplink frame with respect to a corresponding downlink frame. $N_{TA,adj}^{UE}$ refers to an offset determined based on positions of the UE and the non-terrestrial network entity, $N_{TA,offset}$ refers to a ground station to non-terrestrial network entity adjustment value, $N_{TA,adj}^{common}$ refers to a UE to non-terrestrial network entity adjustment value, and $N_{TA}$ refers to a value based on received timing advance commands. $N_{TA,offset}$ and $N_{TA,adj}^{common}$ may be configured by the network (e.g., the UE may receive indications of $N_{TA,offset}$ and $N_{TA,adj}^{common}$ via control signaling).

$$T_{TA}=(N_{TA}+N_{TA,offset}+N_{TA,adj}^{common}+N_{TA,adj}^{UE})T_s \quad (1)$$

Equation 2 below indicates a total frequency adjustment, $T_{FA}$, a UE may apply to an uplink frame with respect to a corresponding downlink frame. $N_{FREQ}$ may be a value based on frequency adjustment commands, similar to timing advance commands, and $N_{FREQ,adj}$ refers to an offset determined based on positions of the UE and the non-terrestrial network entity.

$$T_{FA}=(N_{FREQ}+N_{FREQ,adj}^{UE})T_s \quad (2)$$

The accuracy of the timing or frequency adjustment depends on the accuracy of the location information, which may erode over time as the non-terrestrial network entity (e.g., satellite) and UE change locations. More frequent location monitoring may increase the accuracy of the location information, but also increase power consumption at the UE. Fewer location updates may result in a demand to perform a random access procedure to re-establish timing or frequency consistency with the NTN. According to current techniques, when performing random access, $N_{TA}$ is reset to a value of "0" when the UE transmits a preamble of the random access procedure. However, this reset may cause reception problems and errors because of relatively large changes in locations of the UE and the non-terrestrial network entity in an NTN. Similar issues arise when performing frequency corrections in NTNs, where the frequency adjustment may be reset to a value of "0" for preamble transmission.

The present disclosure relates to techniques for mitigating error in time or frequency adjustments for preambles of a random access procedure. The UE may use one value for the adjustment when transmitting data to the NTN, but then transmit the preamble of a random access procedure according to a preamble-specific time or frequency adjustment based on one or more indications received from the network (e.g., rather than resetting the adjustment to "0"). In a first aspect, the UE may accumulate timing or frequency adjustments received from the non-terrestrial network entity in timing or frequency adjustment commands (e.g., otherwise used for uplink data transmissions), and transmit the preamble using the accumulated adjustment value during random access. In a second aspect, the UE may receive a control message indicating a specific non-zero timing or frequency adjustment value to use for the preamble (e.g., in place of the accumulated value for the total adjustment calculation). In a third aspect, the UE may use a total timing or frequency adjustment value based on an adjustment received from the non-terrestrial network entity in a previously-received random access response (RAR) message. By using some signaled value for the preamble-specific timing or frequency adjustment rather than resetting the adjustment to "0," preamble reception performance may be maintained or improved with as many or fewer position measurements for the UE or non-terrestrial network entity (e.g., satellite).

Aspects of the disclosure are initially described in the context of wireless communications systems. Aspects of the disclosure are further illustrated by and described with reference to process flows, apparatus diagrams, system diagrams, and flowcharts that relate to closed loop time and frequency corrections in non-terrestrial networks.

FIG. 1 illustrates an example of a wireless communications system 100 that supports closed loop time and frequency corrections in non-terrestrial networks in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support closed loop time and frequency corrections in non-terrestrial networks as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

The wireless communications system 100 may be a terrestrial network or a NTN, or a combination thereof. A NTN may provide coverage by using high-altitude devices (e.g., a satellite 185) between the UE 115 and terrestrial based network entities 105. A UE 115 may calculate a timing adjustment or a frequency adjustment for uplink transmissions to a non-terrestrial network entity 105. A total timing adjustment that a UE 115 uses may be calculated by UE 115, for example according to Equation 1. A total frequency adjustment that a UE 115 uses may be calculated by UE 115, for example according to Equation 2. UE 115 may calculate one or both of a total timing adjustment or a total frequency adjustment. The accuracy of the timing or frequency adjustment may depend in part on the accuracy of the location information, which may erode over time as one or both of the non-terrestrial network entity (e.g., satellite) and UE change locations.

A UE 115 may use one value for the adjustment when transmitting data to a non-terrestrial network entity 105, but then transmit the preamble of a random access procedure to the non-terrestrial network entity 105 according to a preamble-specific time or frequency adjustment based on one or more indications received from the network (e.g., rather than resetting the adjustment to "0"). In some cases, the UE 115 may accumulate timing or frequency adjustments received from the non-terrestrial network entity 105 in timing or frequency adjustment commands (e.g., otherwise used for uplink data transmissions), and transmit the preamble using the accumulated adjustment value during random access. In some cases, the UE 115 may receive a control message indicating a specific non-zero value to use for the preamble (e.g., in place of the accumulated value for the total adjustment calculation). In some cases, the UE 115 may use a total value based on an adjustment received from the non-terrestrial network entity 105 in a previously-received RAR message. By using some signaled value for the preamble-specific timing or frequency adjustment rather than resetting the adjustment to "0," preamble reception performance may be maintained or improved with as many or fewer position measurements for the UE 115 or non-terrestrial network entity 105.

Figure 2:
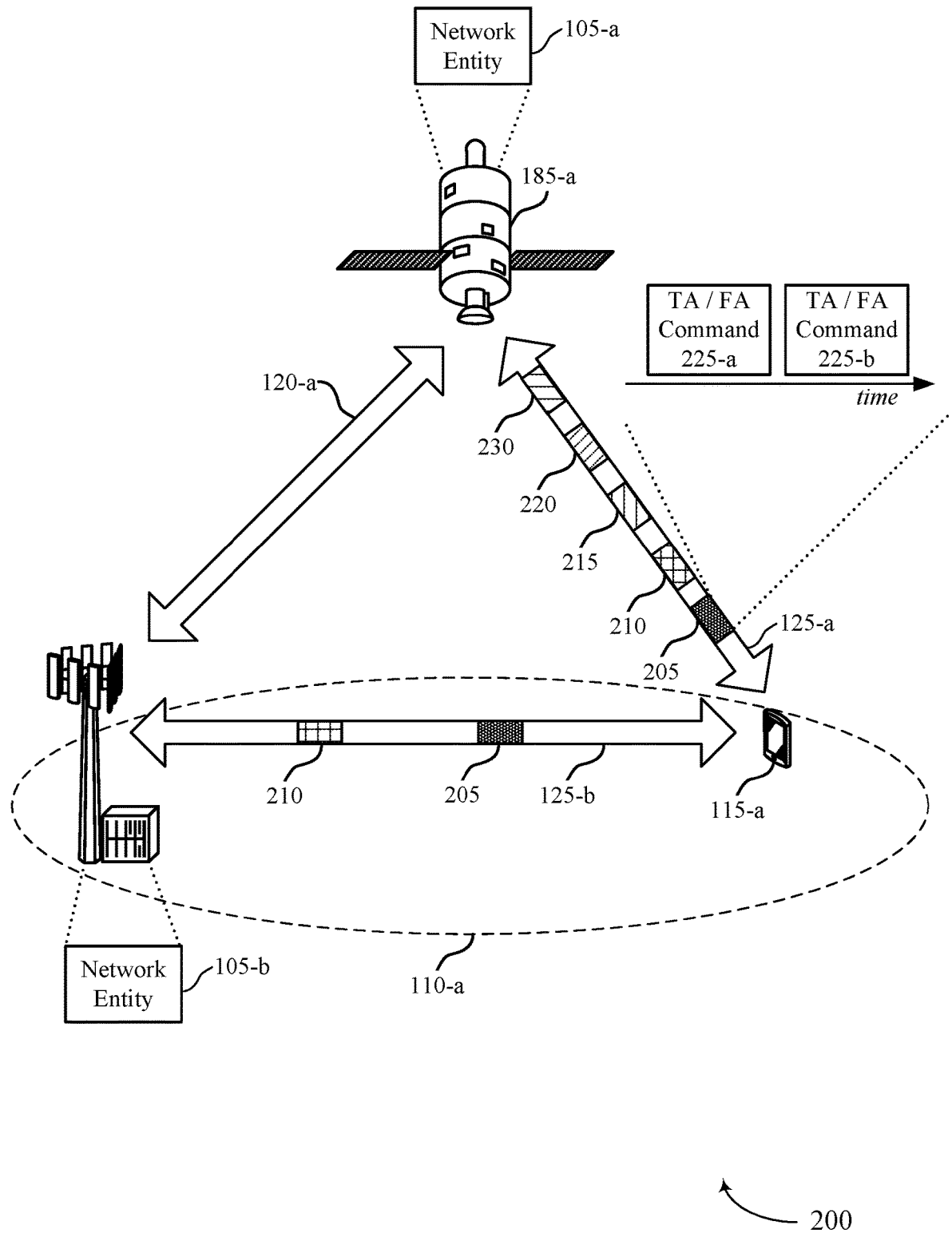
FIG. 2 illustrates an example of a wireless communications system that supports closed loop time and frequency corrections in non-terrestrial networks in accordance with one or more aspects of the present disclosure.

FIG. 2 illustrates an example of a wireless communications system 200 that supports closed loop time and frequency corrections in non-terrestrial networks in accordance with one or more aspects of the present disclosure. In some examples, the wireless communications system 200 may implement aspects of the wireless communications system 100 or may be implemented by aspects of the wireless communications system 100. The wireless communications system 200 may be an example of a terrestrial network or an NTN, or a combination thereof. For example, the wireless communications system 200 may include a network entity 105-*a* located at a satellite 185-*a*, a network entity 105-*b* in a terrestrial network, and a UE 115-*a*. The network entity 105-*a*, the satellite 185-*a*, the network entity 105-*b*, and the UE 115-*a* may be examples of network entities 105, a satellite 185, and a UE 115 as described herein.

The wireless communications system 200 may provide a geographic coverage area 110-*a* by using the network entity 105-*a* located on the satellite 185-*a* between the network entity 105-*b* and the UE 115-*a*. The network entity 105-*a* and the network entity 105-*b* may therefore serve a geographic coverage area 110-*a* with assistance of or through the satellite 185-*a*. In some examples, a ground network entity (e.g., the network entity 105-*b*) may be or be at a gateway (e.g., in this case, the network entity 105-*a* located on the satellite 185-*a* may perform scheduling, radio link control, etc.)

The UE 115-*a* may communicate with the network entity 105-*a* using a communication link 125-*a*, which may be examples of NR or LTE links between the UE 115-*a* and the network entity 105-*a*. The communication link 125-*a* may include a bi-directional link that enables both uplink and downlink communication. For example, the UE 115-*a* may transmit uplink transmissions, such as uplink control signals or uplink data signals, to the network entity 105-*a* using the communication link 125-*a* and the network entity 105-*a* may transmit downlink transmissions, such as downlink control signals or downlink data signals, to the UE 115-*a* using the communication link 125-*a*.

The UE 115-*a* may communicate with the network entity 105-*b* using a communication link 125-*b*, which may be examples of NR or LTE links between the UE 115-*a* and the network entity 105-*b*. The communication link 125-*b* may include a bi-directional link that enables both uplink and downlink communication. For example, the UE 115-*a* may transmit uplink transmissions, such as uplink control signals or uplink data signals, to the network entity 105-*b* using the communication link 125-*b* and the network entity 105-*b* may transmit downlink transmissions, such as downlink control signals or downlink data signals, to the UE 115-*a* using the communication link 125-*b*.

The network entity 105-*a* may communicate with the network entity 105-*b* using a backhaul communication link 120-a. In some examples, the network entity 105-a may relay communications between the network entity 105-b and the UE 115-a via the communication link 125-a and the backhaul communication link 120-a.

The UE 115-a may apply timing adjustments or frequency adjustments to uplink transmissions the UE 115-a transmits to the network entity 105-a. The UE 115-a may calculate timing adjustments according to Equation 1, frequency adjustments according to Equation 2, or both.

The $N_{TA}$ component may be based on receiving a timing adjustment command 225 from the network entity 105-a. In some cases, a timing adjustment command 225 may be in the form of an incremental update, while in some cases a timing adjustment command may be in the form of a holistic update. In a holistic example, in response to a prior RAR 220, a timing adjustment command 225 may specify an entire $N_{TA}$.

The UE 115-a may receive a control message 210 indicating for the UE 115-a to perform a random access procedure (e.g., a physical random access channel (PRACH) procedure) to obtain synchronization with the network entity 105-a. In some examples, any time the UE 115-a transmits a preamble 215 of a PRACH, the UE 115-a may use a value of $N_{TA}$="0", and therefore a PRACH triggered by a physical downlink control channel (PDCCH) order may also use a value of $N_{TA}$="0". Similarly, the UE 115-a may use a value of $N_{FREQ}$="0" when transmitting a preamble of a PRACH. In an incremental example, the $N_{TA}$ or $N_{FREQ}$ may be incremented by on or more timing or frequency adjustment commands 225 (e.g., timing or frequency adjustment command 225-a or timing or frequency adjustment command 225-b). For example, in an incremental example, $N_{TA,new} = N_{TA,old} + TA_{command}$, where $N_{TA,new}$ refers to the value of $N_{TA}$ after receiving a timing adjustment command 225, $N_{TA,old}$ refers to the value of $N_{TA}$ after receiving a timing adjustment command 225, and $TA_{command}$ refers to the timing adjustment value indicated in the timing adjustment command. Incremental timing or frequency adjustment commands 225 may be transmitted via a MAC control element (CE) or a downlink control information message.

$N_{TA,adj}^{UE}$ and $N_{FREQ,adj}^{UE}$ may be determined by the UE 115-a to pre-compensate UE to satellite round trip delays (which may be relatively large delays in some examples), and may be based on the location of the UE 115-a (e.g., by acquiring a Global Navigation Satellite System (GNSS)) position fix) and the location of the network entity 105-a (e.g., the satellite 185-a) (e.g., by reading the satellite ephemeris information broadcast on system information blocks (SIBs)). The accuracy over time of $N_{TA,adj}^{UE}$ and $N_{FREQ,adj}^{UE}$ may depend on the accuracy of the location information for the UE 115-a and the network entity 105-a (e.g., the satellite 185-a). For a mobile UE 115-a, if a considerable amount of time has passed since the last GNSS position fix, the accuracy of $N_{TA,adj}^{UE}$ and $N_{FREQ,adj}^{UE}$ may be low relative to their value with a recent GNSS position fix. Similarly, if a considerable amount of time (e.g., larger than some time threshold) has passed since the last reading of the satellite ephemeris, the accuracy of $N_{TA,adj}^{UE}$ and $N_{FREQ,adj}^{UE}$ may be low. Frequent readings of satellite ephemeris or GNSS position fixes may increase accuracy and reduce the number of demanded timing or frequency adjustment commands 225. With frequent readings of satellite ephemeris or GNSS position fixes, timing or frequency adjustment commands may follow legacy terrestrial timing or frequency adjustment command methodology. Frequent readings of satellite ephemeris or GNSS position fixes, however, may be associated with a high power consumption at the UE 115-a. Accordingly, the UE 115-a may less frequently obtain readings of satellite ephemeris or GNSS position fixes to save power, which may result in less accurate $N_{TA,adj}^{UE}$ and $N_{FREQ,adj}^{UE}$ values. Further, with less frequent readings of satellite ephemeris or GNSS position fixes, the UE 115-a may more frequently perform random access procedures (e.g., including transmitting a preamble 215 of a PRACH) to more frequently obtain synchronization with the network entity 105-a.

In one case, a UE 115-a may identify GNSS position fixes or satellite ephemeris at the beginning of a connection (to) and the value of $N_{TA,adj}^{UE}$ may be $L_0$. If the UE 115-a does not acquire additional GNSS position fixes or satellite ephemeris during the remainder of the connection, the UE 115-a may assume that $N_{TA,adj}^{UE} = L_0$. As the location information for the UE 115-a and the network entity 105-a (e.g., the satellite 185-a) becomes progressively outdated, the error in $N_{TA,adj}^{UE}$ (which may be referred to as E(t)) increases in time. If $N_{TA}=0$ for a preamble 215 of a PRACH, the network entity 105-a will correct for the entire error E(t) at each time instant $t > t_0$ when a preamble 215 of a PRACH is transmitted. Similar error may occur for frequency adjustments as time elapses due to outdated location information. Several approaches may be used to mitigate error caused by the changes in position of the UE 115-a and the satellite 185-a over time.

The UE 115-a that has established a communication session with the network entity 105-a may receive, from the network entity 105-a, control signaling 205 identifying a preamble-specific time or frequency adjustment for a preamble 215 of a random access procedure to be performed during the communication session. In some cases, the UE 115-a may receive the control signaling 205 or the control message 210 from the network entity 105-b.

In some cases, the preamble-specific time or frequency adjustment for a preamble 215 may be based on an accumulation of timing or frequency adjustment commands 225. In some cases, the $N_{TA,adj}^{UE}$ that a UE 115-a should use to transmit a preamble 215 of a random access procedure at a time t (where the communication session began at to) may be given by $L_0 + \Sigma_{i=1}^{Q(t)} C(i)$, where Q(t) denotes the number of prior timing adjustment commands 225 received up to time t, and C(i) denotes the value of a timing adjustment command for the particular indexed timing adjustment instance i. The value $\Sigma_{i=1}^{Q(t)} C(i)$ may be incorporated into Equation 1 into several ways. In some cases, the accumulation may be incorporated into $N_{TA}$. For example, the $N_{TA}$ used for the preamble 215 of a PRACH may accumulate prior timing adjustment commands 225 up to the transmission time of the preamble 215, and the subsequent timing adjustment command 225 may be interpreted as an adjustment or increment to the $N_{TA}$. In some cases, the accumulation may be treated as a new value S(t) added to Equation 1 (e.g., in addition to $N_{TA}$, $N_{TA,offset}$, $N_{TA,adj}^{common}$, and $N_{TA,adj}^{UE}$), which may be used to capture $\Sigma_{i=1}^{Q(t)} C(i)$ and may be updated after reception of each timing adjustment command. In some cases, the $N_{TA,adj}^{UE}$ term may accumulate the timing adjustments of prior timing adjustment commands 225 (e.g., $N_{TA}$ may be set to zero and $N_{TA,adj}^{UE} = L_0 + \Sigma_{i=1}^{Q(t)} C(i)$). In each case, the accumulation parameter ($\Sigma_{i=1}^{Q(t)} C(i)$) may be reset to zero when the UE 115-a identifies updated GNSS position fixes and satellite ephemeris.

Frequency adjustments from frequency adjustment commands 225 may similarly be accumulated and accounted for in Equation 2. For example, frequency adjustments from frequency adjustment commands 225 may be accumulated into one of a new value R(t), $N_{FREQ}$, or $N_{FREQ,adj}^{UE}$.

In some cases, the UE 115-a may be configured (e.g., via the control signaling 205) to use a specific value of $N_{TA}$ or $N_{TA,adj}^{UE}$ for timing adjustments or $N_{FREQ}$ or $N_{FREQ,adj}^{UE}$ for frequency adjustments for transmitting a preamble 215 of a PRACH. For example, the control signaling 205 may be a MAC-CE that indicates the specific value for $N_{TA}$ or $N_{TA,adj}^{UE}$ for timing adjustments, or $N_{FREQ}$ or $N_{FREQ,adj}^{UE}$ for frequency adjustments for transmitting a preamble 215 of a PRACH, or both. In some cases, the control signaling 205 may indicate that the specific value of $N_{TA}$ or $N_{TA,adj}^{UE}$ for timing adjustments or $N_{FREQ}$ or $N_{FREQ,adj}^{UE}$ for frequency adjustments to use for transmitting a preamble 215 of a PRACH is the "current" value of $N_{TA}$ for timing adjustments or $N_{FREQ}$ for frequency adjustments. For example, the UE 115-a may be configured to use $N_{TA,adj}^{UE}$ (PRACH)=$N_{TA,adj}^{UE}$(current)+$N_{TA}$(current), where $N_{TA}$ (PRACH)=0, and $N_{TA,adj}^{UE}$(PRACH) refers to the $N_{TA,adj}^{UE}$ to apply to a preamble 215 of a PRACH. $N_{TA}$(current) may be defined as the last value of $N_{TA}$ provided in a RAR 220 or by accumulating non-RAR timing adjustments from timing adjustment commands 225. $N_{TA,adj}^{UE}$ (current) may refer to the $N_{TA,adj}^{UE}$(current) determined based on the most recent GNSS position fixes and satellite ephemeris. In some examples, the UE 115-a may be configured to use $N_{TA}$ (PRACH)=$N_{TA}$(current).

In some cases, the UE 115-a may be configured (e.g., via the control signaling 205) to use an explicit value of $N_{TA}$ or $N_{TA,adj}^{UE}$ for timing adjustments or $N_{FREQ}$ or $N_{FREQ,adj}^{UE}$ for frequency adjustments for transmitting a preamble 215 of a PRACH. For example, the network entity 105-a may directly indicate the value of $N_{TA}$ or $N_{TA,adj}^{UE}$ for timing adjustments, or $N_{FREQ}$ or $N_{FREQ,adj}^{UE}$ for frequency adjustments for transmitting a preamble 215 of a PRACH, or both. In some cases, the UE 115-a may report the current values of the timing or frequency adjustment values (e.g., $N_{TA}$ or $N_{TA,adj}^{UE}$ for timing adjustments or $N_{FREQ}$ or $N_{FREQ,adj}^{UE}$ for frequency adjustments) in a timing or frequency adjustment report. The directly indicated value(s) may be absolute or may be differential with respect to the previous timing or frequency adjustment report 230.

Figure 3:
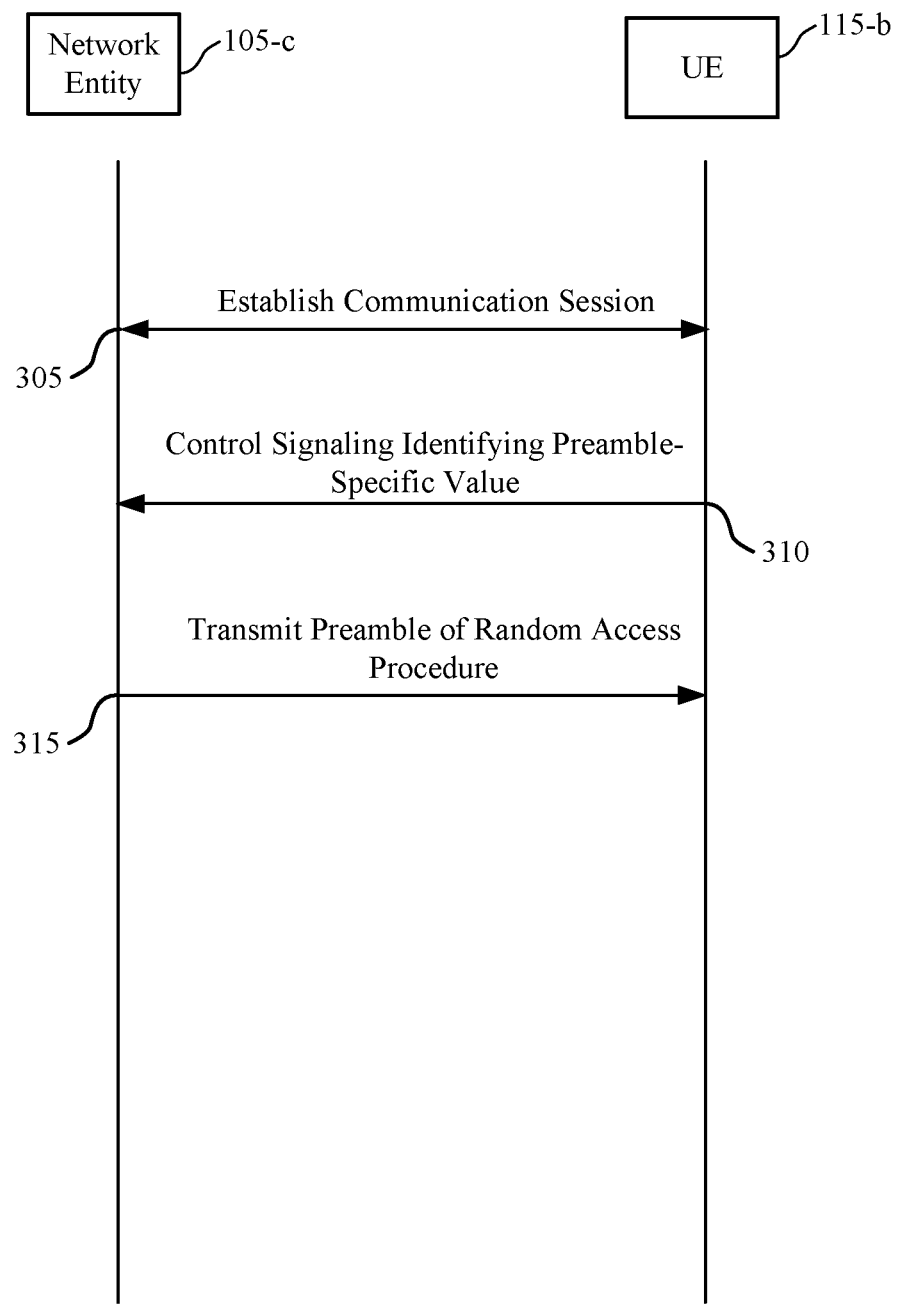
FIG. 3 illustrates an example of a process flow that supports closed loop time and frequency corrections in non-terrestrial networks in accordance with one or more aspects of the present disclosure.

FIG. 3 illustrates an example of a process flow 300 that supports closed loop time and frequency corrections in non-terrestrial networks in accordance with one or more aspects of the present disclosure. The process flow 300 may include a UE 115-b, which may be an example of a UE 115 as described herein. The process flow 300 may include a non-terrestrial network entity 105-c, which may be an example of a network entity 105 as described herein. In the following description of the process flow 300, the operations between the non-terrestrial network entity 105-c and the UE 115-b may be transmitted in a different order than the example order shown, or the operations performed by the non-terrestrial network entity 105-c and the UE 115-b may be performed in different orders or at different times. Some operations may also be omitted from the process flow 300, and other operations may be added to the process flow 300.

At 305, the UE 115-b may establish a communication session with a network via a non-terrestrial network entity 105-c.

At 310, the UE 115-b may receive, from the non-terrestrial network entity 105-c, control signaling identifying a preamble-specific time or frequency adjustment applicable to a transmission of a preamble of a random access procedure to be performed during the communication session.

In some cases, receiving the control signaling at 310 may include receiving a control message indicating an explicit time or frequency adjustment value, where the preamble-specific time or frequency adjustment is based on the explicit time or frequency adjustment value.

In some cases, receiving the control signaling at 310 may include receiving, before transmitting the preamble, one or more time or frequency adjustment commands indicating one or more respective time or frequency adjustment values, and determining the preamble-specific time or frequency adjustment based on an accumulation of the one or more respective time or frequency adjustment values. In some cases, the UE 115-b may reset the accumulation of the one or more respective time or frequency adjustment values to zero based at least in part on updated position information associated with the UE 115-b from a satellite positioning network, updated ephemeris information associated with the non-terrestrial network entity 105-c, or both. In some cases, the UE 115-b may identify a time or frequency adjustment parameter based on a first position of the UE 115-b and a second position of the non-terrestrial network entity 105-c, where the preamble-specific time or frequency adjustment is determined based on the time or frequency adjustment parameter and the accumulation.

In some cases, receiving the control signaling at 310 includes receiving a RAR message indicating a time or frequency adjustment parameter and determining the preamble-specific time or frequency adjustment based on the time or frequency adjustment parameter.

In some cases, the UE 115-b receives the control signaling at 310 via a MAC-CE.

At 315, the UE 115-b may transmit, to the non-terrestrial network entity 105-c, the preamble of the random access procedure according to a total time or frequency adjustment value that is based on the preamble-specific time or frequency adjustment.

In some cases, the total time or frequency adjustment value includes a first time or frequency adjustment parameter that has a range of potential values based on zero or more time or frequency adjustment commands received from the non-terrestrial network entity 105-c and a second time or frequency adjustment parameter based on a first position of the UE 115-b and a second position of the non-terrestrial network entity 105-c, and the control signaling received at 310 includes the first time or frequency adjustment parameter, the second time or frequency adjustment parameter, or any combination thereof.

In some cases, the total time or frequency adjustment value is based on a first time or frequency adjustment parameter that has a range of potential values based on zero or more time or frequency adjustment commands received from the non-terrestrial network entity 105-c prior to transmitting the preamble, a second time or frequency adjustment parameter based on a first position of the UE 115-b and a second position of the non-terrestrial network entity 105-c, and the preamble-specific time or frequency adjustment.

In some cases, the UE 115-b may receive a control message indicating for the UE 115-b to perform the random access procedure, where the preamble of the random access procedure is transmitted at least in part in response to the received control message.

In some cases, the UE 115-b may receive, from the non-terrestrial network entity 105-c and after transmitting the preamble, control signaling indicating for the UE 115-b to acquire updated position information for the UE 115-b from a satellite positioning network, indicating for the UE 115-*b* to acquire updated ephemeris information associated with the non-terrestrial network entity 105-*c*, or both.

In some cases, the UE 115-*b* may acquire updated position information for the UE 115-*b* from a satellite positioning network, updated ephemeris information associated with the non-terrestrial network entity 105-*c*, or both, based on the UE 115-*b* failing to receive a response to the transmitted preamble or one or more retransmissions of the preamble.

Figure 4:
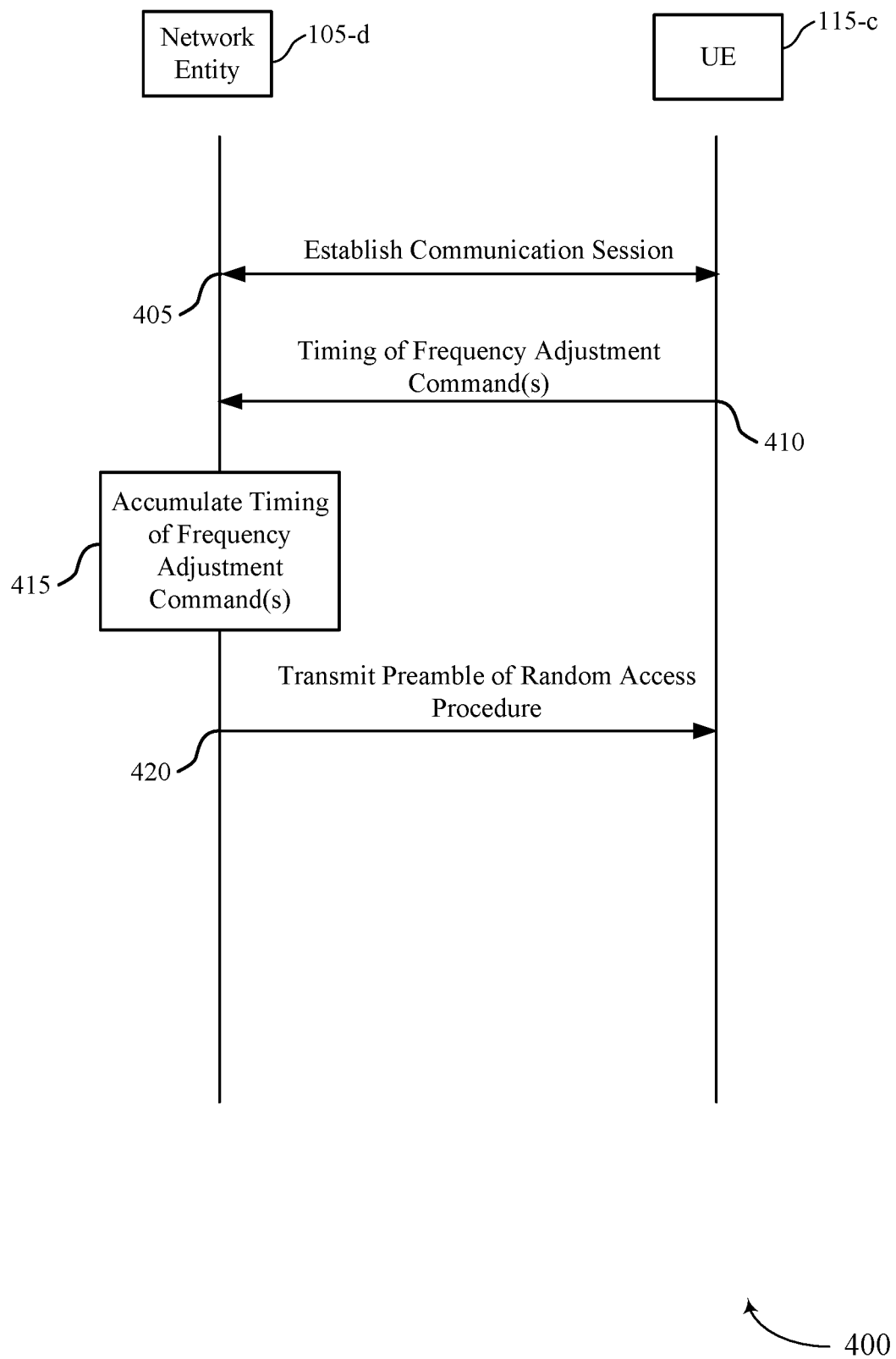
FIG. 4 illustrates an example of a process flow that supports closed loop time and frequency corrections in non-terrestrial networks in accordance with one or more aspects of the present disclosure.

FIG. 4 illustrates an example of a process flow 400 that supports closed loop time and frequency corrections in non-terrestrial networks in accordance with one or more aspects of the present disclosure. The process flow 400 may include a UE 115-*c*, which may be an example of a UE 115 as described herein. The process flow 400 may include a non-terrestrial network entity 105-*d*, which may be an example of a network entity 105 as described herein. In the following description of the process flow 400, the operations between the non-terrestrial network entity 105-*d* and the UE 115-*c* may be transmitted in a different order than the example order shown, or the operations performed by the non-terrestrial network entity 105-*d* and the UE 115-*c* may be performed in different orders or at different times. Some operations may also be omitted from the process flow 400, and other operations may be added to the process flow 400.

At 405, the UE 115-*c* may establish a communication session with a network via a non-terrestrial network entity 105-*d*.

At 410, the UE 115-*c* may receive one or more time or frequency adjustment commands indicating one or more respective time or frequency adjustment values.

At 415, the UE 115-*c* may accumulate timing or frequency adjustments values indicated in the one or more time or frequency adjustment commands.

In some cases, the UE 115-*c* may reset the accumulation of the one or more respective time or frequency adjustment values to zero based at least in part on updated position information associated with the UE 115-*c* from a satellite positioning network, updated ephemeris information associated with the non-terrestrial network entity 105-*d*, or both. In some cases, the UE 115-*c* may identify a time or frequency adjustment parameter based on a first position of the UE 115-*c* and a second position of the non-terrestrial network entity 105-*d*, where the preamble-specific time or frequency adjustment is determined based on the time or frequency adjustment parameter and the accumulation.

At 420, the UE 115-*c* may transmit, to the non-terrestrial network entity 105-*d*, the preamble of the random access procedure according to a total time or frequency adjustment value that is based on the preamble-specific time or frequency adjustment.

In some cases, the UE 115-*c* may receive a control message indicating for the UE 115-*c* to perform the random access procedure, where the preamble of the random access procedure is transmitted at least in part in response to the received control message.

In some cases, the UE 115-*c* may receive, from the non-terrestrial network entity 105-*d* and after transmitting the preamble, control signaling indicating for the UE 115-*c* to acquire updated position information for the UE 115-*c* from a satellite positioning network, indicating for the UE 115-*c* to acquire updated ephemeris information associated with the non-terrestrial network entity 105-*d*, or both.

In some cases, the UE 115-*c* may acquire updated position information for the UE 115-*c* from a satellite positioning network, updated ephemeris information associated with the non-terrestrial network entity 105-*d*, or both, based on the UE 115-*c* failing to receive a response to the transmitted preamble or one or more retransmissions of the preamble.

Figure 5:
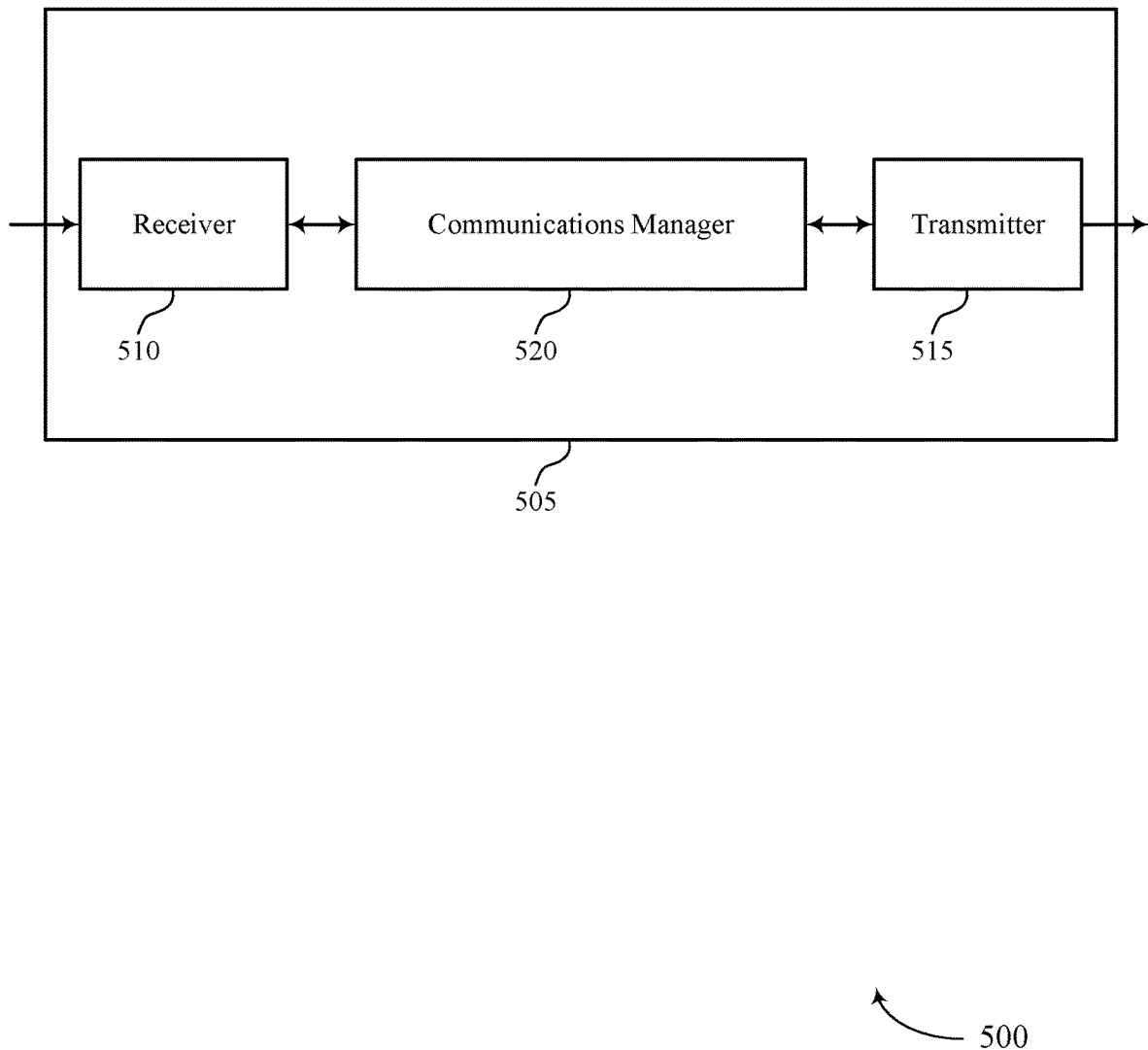
FIGS. 5 and 6 show block diagrams of devices that support closed loop time and frequency corrections in non-terrestrial networks in accordance with one or more aspects of the present disclosure.

FIG. 5 shows a block diagram 500 of a device 505 that supports closed loop time and frequency corrections in non-terrestrial networks in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to closed loop time and frequency corrections in non-terrestrial networks). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to closed loop time and frequency corrections in non-terrestrial networks). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of closed loop time and frequency corrections in non-terrestrial networks as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a UE in accordance with examples as disclosed herein. For example, the communications manager 520 may be configured as or otherwise support a means for establishing a communication session with a network via a non-terrestrial network entity. The communications manager 520 may be configured as or otherwise support a means for receiving, from the non-terrestrial network entity, control signaling identifying a preamble-specific time or frequency adjustment applicable to a transmission of a preamble of a random access procedure to be performed during the communication session. The communications manager 520 may be configured as or otherwise support a means for transmitting, to the network during the communication session, the preamble of the random access procedure according to a total time or frequency adjustment value that is based on the preamble-specific time or frequency adjustment.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for more efficient utilization of communication resources by applying more accurate timing or frequency adjustment values.

Figure 6:
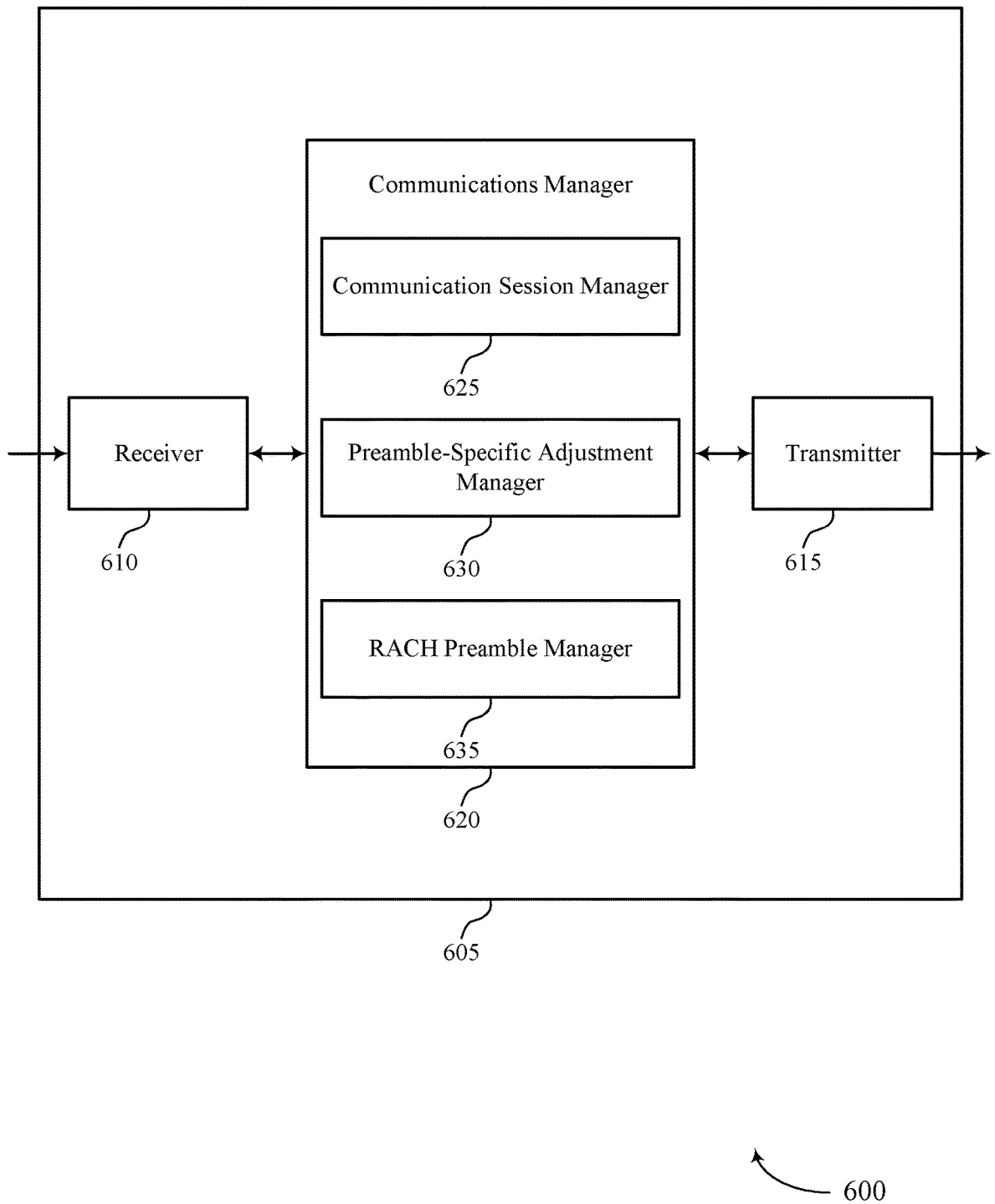

FIG. 6 shows a block diagram 600 of a device 605 that supports closed loop time and frequency corrections in non-terrestrial networks in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to closed loop time and frequency corrections in non-terrestrial networks). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to closed loop time and frequency corrections in non-terrestrial networks). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of closed loop time and frequency corrections in non-terrestrial networks as described herein. For example, the communications manager 620 may include a communication session manager 625, a preamble-specific adjustment manager 630, a random access channel (RACH) preamble manager 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. The communication session manager 625 may be configured as or otherwise support a means for establishing a communication session with a network via a non-terrestrial network entity. The preamble-specific adjustment manager 630 may be configured as or otherwise support a means for receiving, from the non-terrestrial network entity, control signaling identifying a preamble-specific time or frequency adjustment applicable to a transmission of a preamble of a random access procedure to be performed during the communication session. The RACH preamble manager 635 may be configured as or otherwise support a means for transmitting, to the network during the communication session, the preamble of the random access procedure according to a total time or frequency adjustment value that is based on the preamble-specific time or frequency adjustment.

Figure 7:
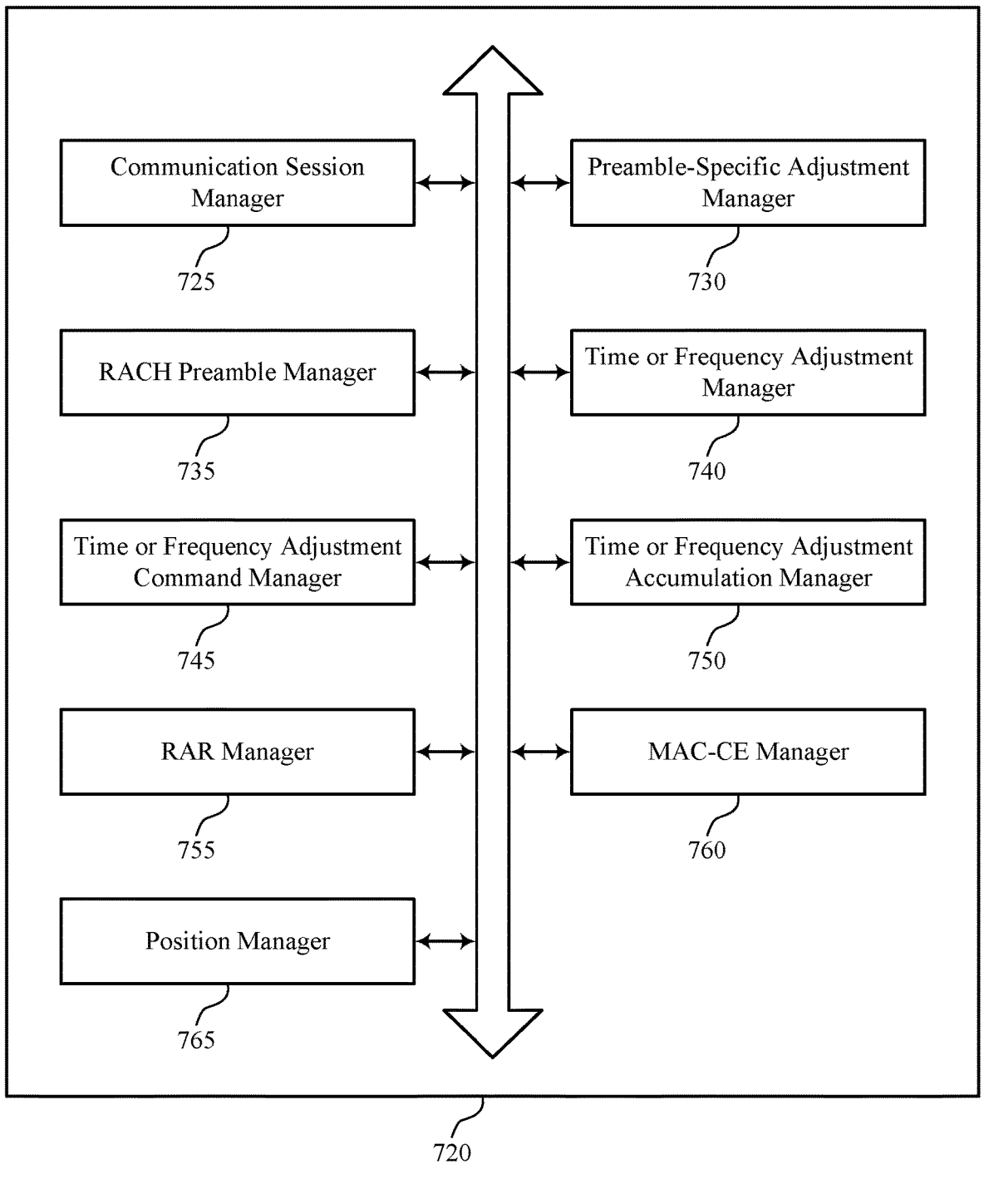
FIG. 7 shows a block diagram of a communications manager that supports closed loop time and frequency corrections in non-terrestrial networks in accordance with one or more aspects of the present disclosure.

FIG. 7 shows a block diagram 700 of a communications manager 720 that supports closed loop time and frequency corrections in non-terrestrial networks in accordance with one or more aspects of the present disclosure. The communications manager 720 may be an example of aspects of a communications manager 520, a communications manager 620, or both, as described herein. The communications manager 720, or various components thereof, may be an example of means for performing various aspects of closed loop time and frequency corrections in non-terrestrial networks as described herein. For example, the communications manager 720 may include a communication session manager 725, a preamble-specific adjustment manager 730, a RACH preamble manager 735, a time or frequency adjustment manager 740, a time or frequency adjustment command manager 745, a time or frequency adjustment accumulation manager 750, a RAR manager 755, a MAC-CE manager 760, a position manager 765, or any combination thereof. Each of these components may communicate, directly or indirectly, with one another (e.g., via one or more buses).

The communications manager 720 may support wireless communications at a UE in accordance with examples as disclosed herein. The communication session manager 725 may be configured as or otherwise support a means for establishing a communication session with a network via a non-terrestrial network entity. The preamble-specific adjustment manager 730 may be configured as or otherwise support a means for receiving, from the non-terrestrial network entity, control signaling identifying a preamble-specific time or frequency adjustment applicable to a transmission of a preamble of a random access procedure to be performed during the communication session. The RACH preamble manager 735 may be configured as or otherwise support a means for transmitting, to the network during the communication session, the preamble of the random access procedure according to a total time or frequency adjustment value that is based on the preamble-specific time or frequency adjustment.

In some examples, to support receiving the control signaling identifying the preamble-specific time or frequency adjustment, the time or frequency adjustment manager 740 may be configured as or otherwise support a means for receiving a control message indicating an explicit time or frequency adjustment value, where the preamble-specific time or frequency adjustment is based on the explicit time or frequency adjustment value.

In some examples, to support receiving the control signaling identifying the preamble-specific time or frequency adjustment, the time or frequency adjustment command manager 745 may be configured as or otherwise support a means for receiving, before transmitting the preamble, one or more time or frequency adjustment commands indicating one or more respective time or frequency adjustment values. In some examples, to support receiving the control signaling identifying the preamble-specific time or frequency adjustment, the time or frequency adjustment accumulation manager 750 may be configured as or otherwise support a means for determining the preamble-specific time or frequency adjustment based on an accumulation of the one or more respective time or frequency adjustment values.

In some examples, the time or frequency adjustment accumulation manager 750 may be configured as or otherwise support a means for resetting the accumulation of the one or more respective time or frequency adjustment values to zero based on updated position information associated with the UE from a satellite positioning network, updated ephemeris information associated with the non-terrestrial network entity, or both.

In some examples, the position manager 765 may be configured as or otherwise support a means for identifying a time or frequency adjustment parameter based on a first position of the UE and a second position of the non-terrestrial network entity, where the preamble-specific time or frequency adjustment is determined based on the time or frequency adjustment parameter and the accumulation.

In some examples, the total time or frequency adjustment value includes a first time or frequency adjustment parameter that has a range of potential values based on zero or more time or frequency adjustment commands received from the non-terrestrial network entity and a second time or frequency adjustment parameter based on a first position of the UE and a second position of the non-terrestrial network entity, and the control signaling identifying the preamble-specific time or frequency adjustment includes the first time or frequency adjustment parameter, the second time or frequency adjustment parameter, or any combination thereof.

In some examples, the total time or frequency adjustment value is based on a first time or frequency adjustment parameter that has a range of potential values based on zero or more time or frequency adjustment commands received from the non-terrestrial network entity prior to transmitting the preamble, a second time or frequency adjustment parameter based on a first position of the UE and a second position of the non-terrestrial network entity, and the preamble-specific time or frequency adjustment.

In some examples, to support receiving the control signaling identifying the preamble-specific time or frequency adjustment for the time or frequency adjustment, the RAR manager 755 may be configured as or otherwise support a means for receiving, before transmitting the preamble, a random access response message indicating a time or frequency adjustment parameter. In some examples, to support receiving the control signaling identifying the preamble-specific time or frequency adjustment for the time or frequency adjustment, the preamble-specific adjustment manager 730 may be configured as or otherwise support a means for determining the preamble-specific time or frequency adjustment based on the time or frequency adjustment parameter.

In some examples, the time or frequency adjustment manager 740 may be configured as or otherwise support a means for receiving control signaling indicating at least one of a first parameter identifying a timing or frequency adjustment offset or a second parameter identifying a timing or frequency adjustment for communications between a ground station and the non-terrestrial network entity, where the total time or frequency adjustment value includes a total timing or frequency adjustment value that is based on the first parameter, the second parameter, and the preamble-specific time or frequency adjustment.

In some examples, to support receiving the control signaling identifying the preamble-specific time or frequency adjustment for the time or frequency adjustment, the MAC-CE manager 760 may be configured as or otherwise support a means for receiving the control signaling identifying the preamble-specific time or frequency adjustment via a MAC-CE.

In some examples, the RACH preamble manager 735 may be configured as or otherwise support a means for receiving a control message indicating for the UE to perform the random access procedure, where the preamble of the random access procedure is transmitted at least in part in response to the received control message.

In some examples, the position manager 765 may be configured as or otherwise support a means for receiving, from the network via the non-terrestrial network entity and after transmitting the preamble, control signaling indicating for the UE to acquire updated position information for the UE from a satellite positioning network, indicating for the UE to acquire updated ephemeris information associated with the non-terrestrial network entity, or both.

In some examples, the position manager 765 may be configured as or otherwise support a means for acquiring updated position information for the UE from a satellite positioning network, updated ephemeris information associated with the non-terrestrial network entity, or both, based on the UE failing to receive a response to the transmitted preamble or one or more retransmissions of the preamble.

In some examples, a satellite includes the non-terrestrial network entity.

Figure 8:
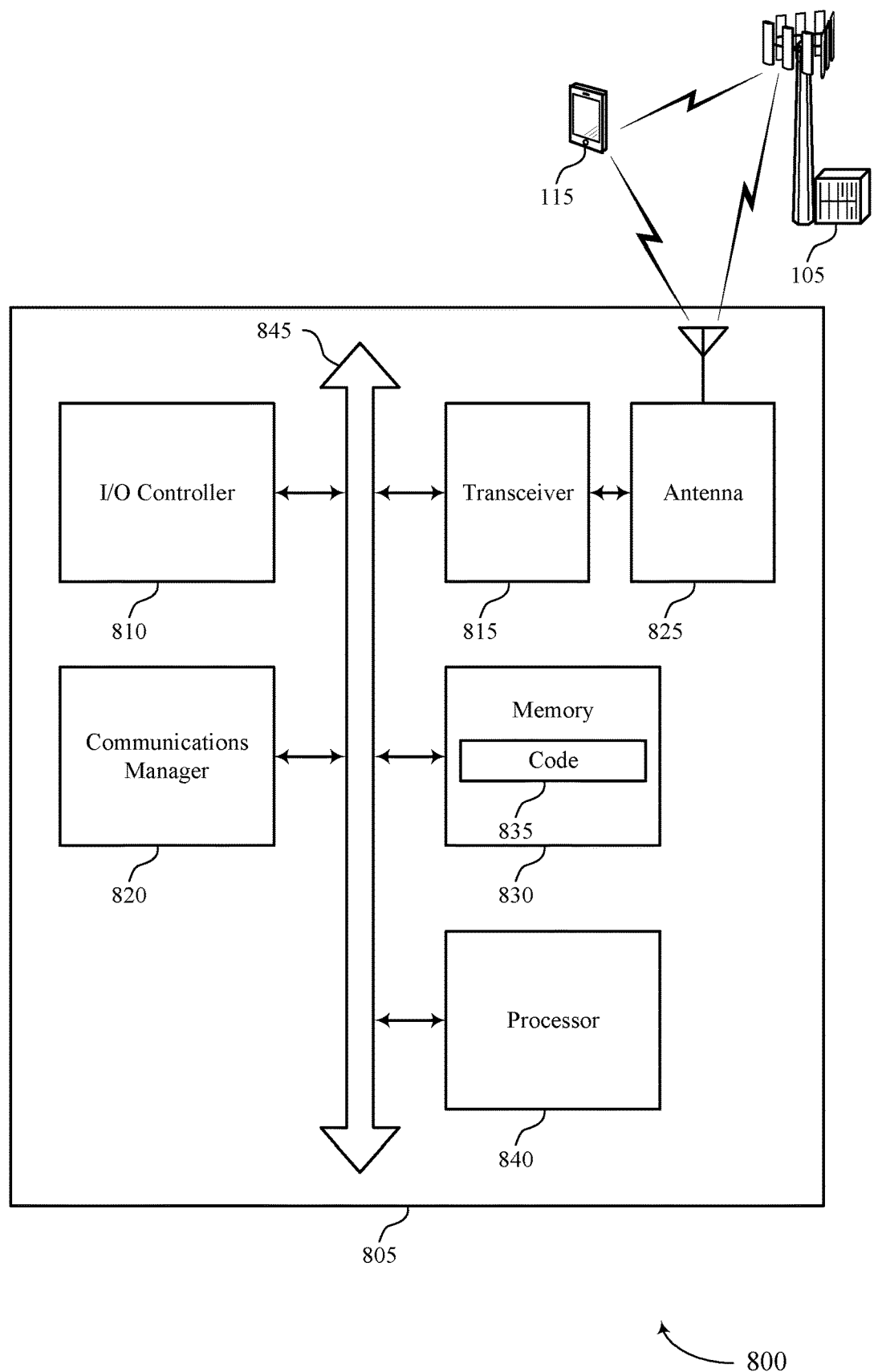
FIG. 8 shows a diagram of a system including a device that supports closed loop time and frequency corrections in non-terrestrial networks in accordance with one or more aspects of the present disclosure.

FIG. 8 shows a diagram of a system 800 including a device 805 that supports closed loop time and frequency corrections in non-terrestrial networks in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via a hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting closed loop time and frequency corrections in non-terrestrial networks). For example, the device 805 or a component of the device 805 may include a processor 840 and memory 830 coupled with or to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for establishing a communication session with a network via a non-terrestrial network entity. The communications manager 820 may be configured as or otherwise support a means for receiving, from the non-terrestrial network entity, control signaling identifying a preamble-specific time or frequency adjustment applicable to a transmission of a preamble of a random access procedure to be performed during the communication session. The communications manager 820 may be configured as or otherwise support a means for transmitting, to the network during the communication session, the preamble of the random access procedure according to a total time or frequency adjustment value that is based on the preamble-specific time or frequency adjustment.

By including or configuring the communications manager 820 in accordance with examples as described herein, the device 805 may support techniques for more efficient utilization of communication resources and improved coordination between devices by applying more accurate timing or frequency adjustment values.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of closed loop time and frequency corrections in non-terrestrial networks as described herein, or the processor 840 and the memory 830 may be otherwise configured to perform or support such operations.

Figure 9:
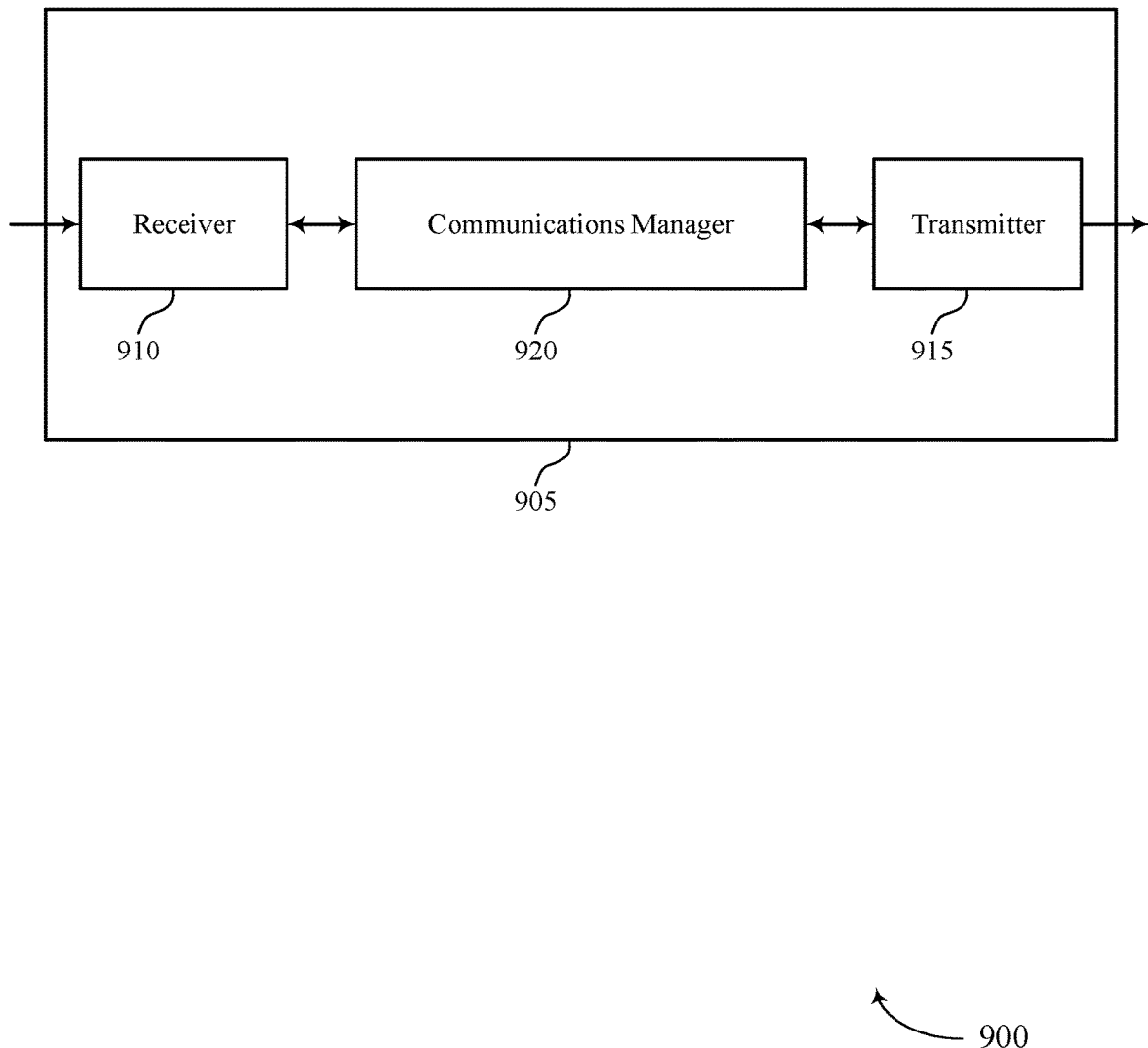
FIGS. 9 and 10 show block diagrams of devices that support closed loop time and frequency corrections in non-terrestrial networks in accordance with one or more aspects of the present disclosure.

FIG. 9 shows a block diagram 900 of a device 905 that supports closed loop time and frequency corrections in non-terrestrial networks in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of closed loop time and frequency corrections in non-terrestrial networks as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network entity in accordance with examples as disclosed herein. For example, the communications manager 920 may be configured as or otherwise support a means for establishing a communication session with a UE via a non-terrestrial network entity. The communications manager 920 may be configured as or otherwise support a means for outputting, to the UE, control signaling identifying a preamble-specific time or frequency adjustment applicable to a transmission of a preamble of a random access procedure to be performed during the communication session. The communications manager 920 may be configured as or otherwise support a means for receiving, from the UE during the communication session, the preamble of the random access procedure according to a total time or frequency adjustment value that is based on the preamble-specific time or frequency adjustment.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for more efficient utilization of communication resources by applying more accurate timing or frequency adjustment values.

Figure 10:
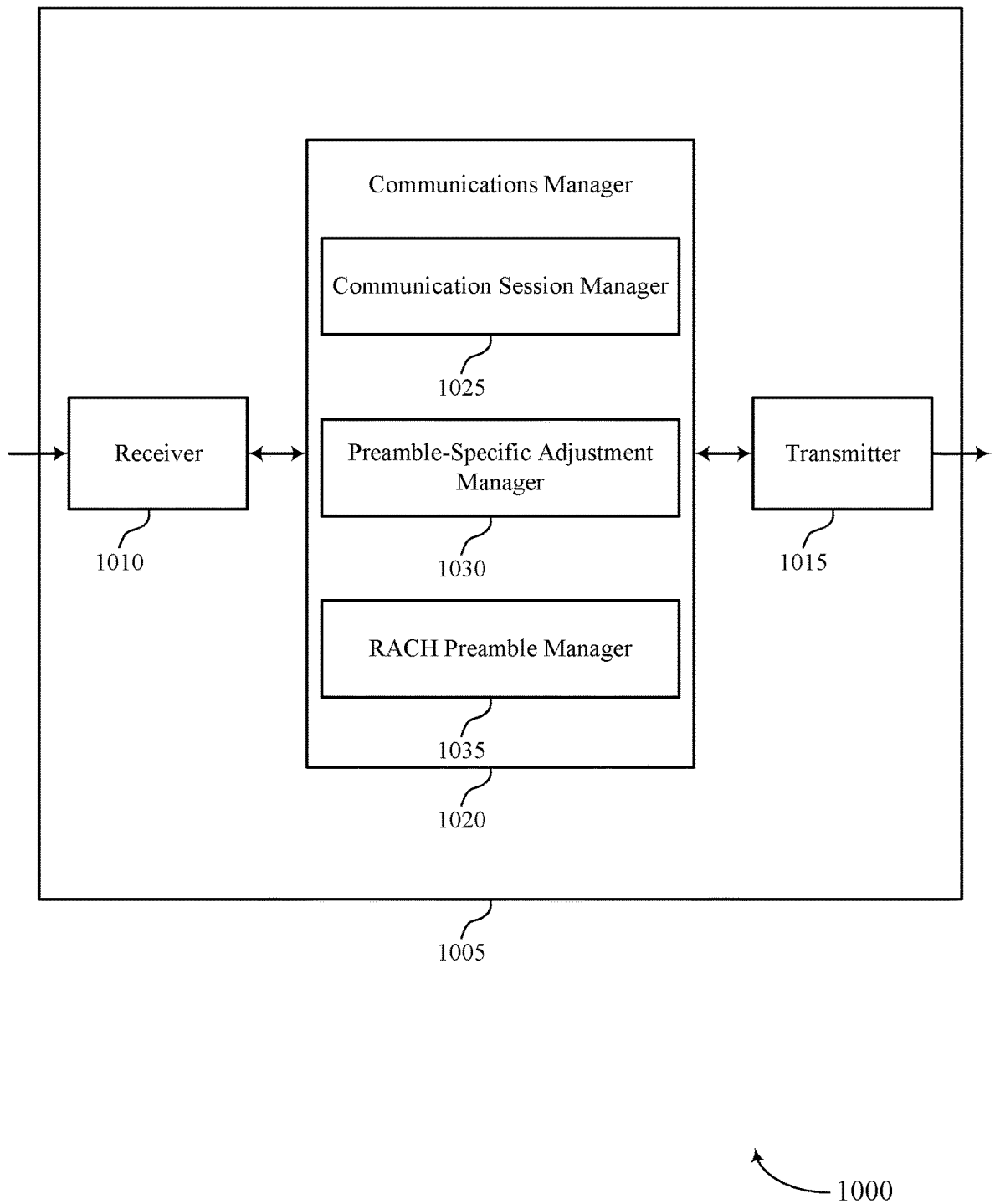

FIG. 10 shows a block diagram 1000 of a device 1005 that supports closed loop time and frequency corrections in non-terrestrial networks in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of closed loop time and frequency corrections in non-terrestrial networks as described herein. For example, the communications manager 1020 may include a communication session manager 1025, a preamble-specific adjustment manager 1030, a RACH preamble manager 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. The communication session manager 1025 may be configured as or otherwise support a means for establishing a communication session with a UE via a non-terrestrial network entity. The preamble-specific adjustment manager 1030 may be configured as or otherwise support a means for outputting, to the UE, control signaling identifying a preamble-specific time or frequency adjustment applicable to a transmission of a preamble of a random access procedure to be performed during the communication session. The RACH preamble manager 1035 may be configured as or otherwise support a means for receiving, from the UE during the communication session, the preamble of the random access procedure according to a total time or frequency adjustment value that is based on the preamble-specific time or frequency adjustment.

Figure 11:
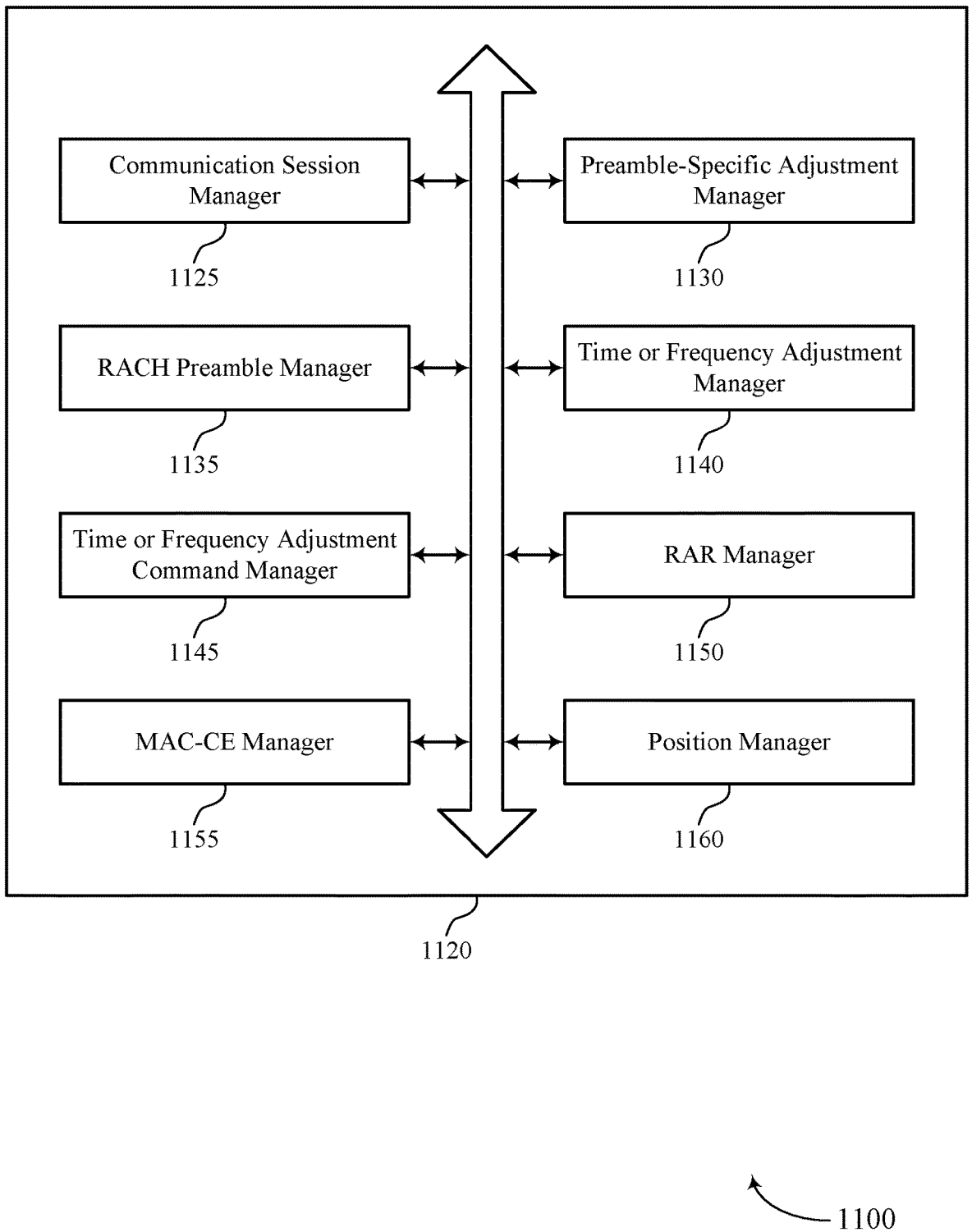
FIG. 11 shows a block diagram of a communications manager that supports closed loop time and frequency corrections in non-terrestrial networks in accordance with one or more aspects of the present disclosure.

FIG. 11 shows a block diagram 1100 of a communications manager 1120 that supports closed loop time and frequency corrections in non-terrestrial networks in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of closed loop time and frequency corrections in non-terrestrial networks as described herein. For example, the communications manager 1120 may include a communication session manager 1125, a preamble-specific adjustment manager 1130, a RACH preamble manager 1135, a time or frequency adjustment manager 1140, a time or frequency adjustment command manager 1145, a RAR manager 1150, a MAC-CE manager 1155, a position manager 1160, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications at a network entity in accordance with examples as disclosed herein. The communication session manager 1125 may be configured as or otherwise support a means for establishing a communication session with a UE via a non-terrestrial network entity. The preamble-specific adjustment manager 1130 may be configured as or otherwise support a means for outputting, to the UE, control signaling identifying a preamble-specific time or frequency adjustment applicable to a transmission of a preamble of a random access procedure to be performed during the communication session. The RACH preamble manager 1135 may be configured as or otherwise support a means for receiving, from the UE during the communication session, the preamble of the random access procedure according to a total time or frequency adjustment value that is based on the preamble-specific time or frequency adjustment.

In some examples, to support outputting the preamble-specific time or frequency adjustment for the time or frequency adjustment, the time or frequency adjustment manager 1140 may be configured as or otherwise support a means for outputting a control message indicating an explicit time or frequency adjustment value, where the preamble-specific time or frequency adjustment is based on the explicit time or frequency adjustment value.

In some examples, to support outputting the control signaling identifying the preamble-specific time or frequency adjustment for the time or frequency adjustment, the time or frequency adjustment command manager 1145 may be configured as or otherwise support a means for outputting, before receiving the preamble, one or more time or frequency adjustment commands indicating one or more respective time or frequency adjustment values, where the preamble-specific time or frequency adjustment is based on an accumulation of the one or more respective time or frequency adjustment values.

In some examples, the position manager 1160 may be configured as or otherwise support a means for identifying a time or frequency adjustment parameter based on a first position of the UE and a second position of the non-terrestrial network entity, where the preamble-specific time or frequency adjustment is determined based on the time or frequency adjustment parameter and the accumulation.

In some examples, the total time or frequency adjustment value includes a first time or frequency adjustment parameter that has a range of potential values based on zero or more time or frequency adjustment commands output to the UE via the non-terrestrial network entity and a second time or frequency adjustment parameter based on a first position of the UE and a second position of the non-terrestrial network entity, and the preamble-specific time or frequency adjustment includes the first time or frequency adjustment parameter, the second time or frequency adjustment parameter, or any combination thereof.

In some examples, the total time or frequency adjustment value is based on a first time or frequency adjustment parameter that has a range of potential values based on zero or more time or frequency adjustment commands output to the UE via the non-terrestrial network entity prior to receiving the preamble, a second time or frequency adjustment parameter based on a first position of the UE and a second position of the non-terrestrial network entity, and the preamble-specific time or frequency adjustment.

In some examples, to support outputting the control signaling identifying the preamble-specific time or frequency adjustment for the time or frequency adjustment, the RAR manager 1150 may be configured as or otherwise support a means for outputting, before receiving the preamble, a random access response message indicating a time or frequency adjustment parameter, where the preamble-specific time or frequency adjustment is based on the time or frequency adjustment parameter.

In some examples, the time or frequency adjustment manager 1140 may be configured as or otherwise support a means for outputting, to the UE via the non-terrestrial network entity, control signaling indicating at least one of a first parameter identifying a timing or frequency adjustment offset or a second parameter identifying a timing or frequency adjustment for communications between a ground station and the non-terrestrial network entity, where the total time or frequency adjustment value includes a total timing or frequency adjustment value that is based on the first parameter, the second parameter, and the preamble-specific time or frequency adjustment.

In some examples, to support outputting the control signaling identifying the preamble-specific time or frequency adjustment for the time or frequency adjustment, the MAC-CE manager 1155 may be configured as or otherwise support a means for outputting the control signaling identifying the preamble-specific time or frequency adjustment via a MAC-CE.

In some examples, the RACH preamble manager 1135 may be configured as or otherwise support a means for outputting a control message indicating for the UE to perform the random access procedure, where the preamble of the random access procedure is received at least in part in response to the output control message.

In some examples, the position manager 1160 may be configured as or otherwise support a means for outputting, to the UE after receiving the preamble, control signaling indicating for the UE to acquire updated position information for the UE from a satellite positioning network, indicating for the UE to acquire updated ephemeris information associated with the non-terrestrial network entity, or both.

In some examples, a satellite includes the non-terrestrial network entity, the network entity includes the non-terrestrial network entity, a ground station includes the network entity, or any combination thereof.

Figure 12:
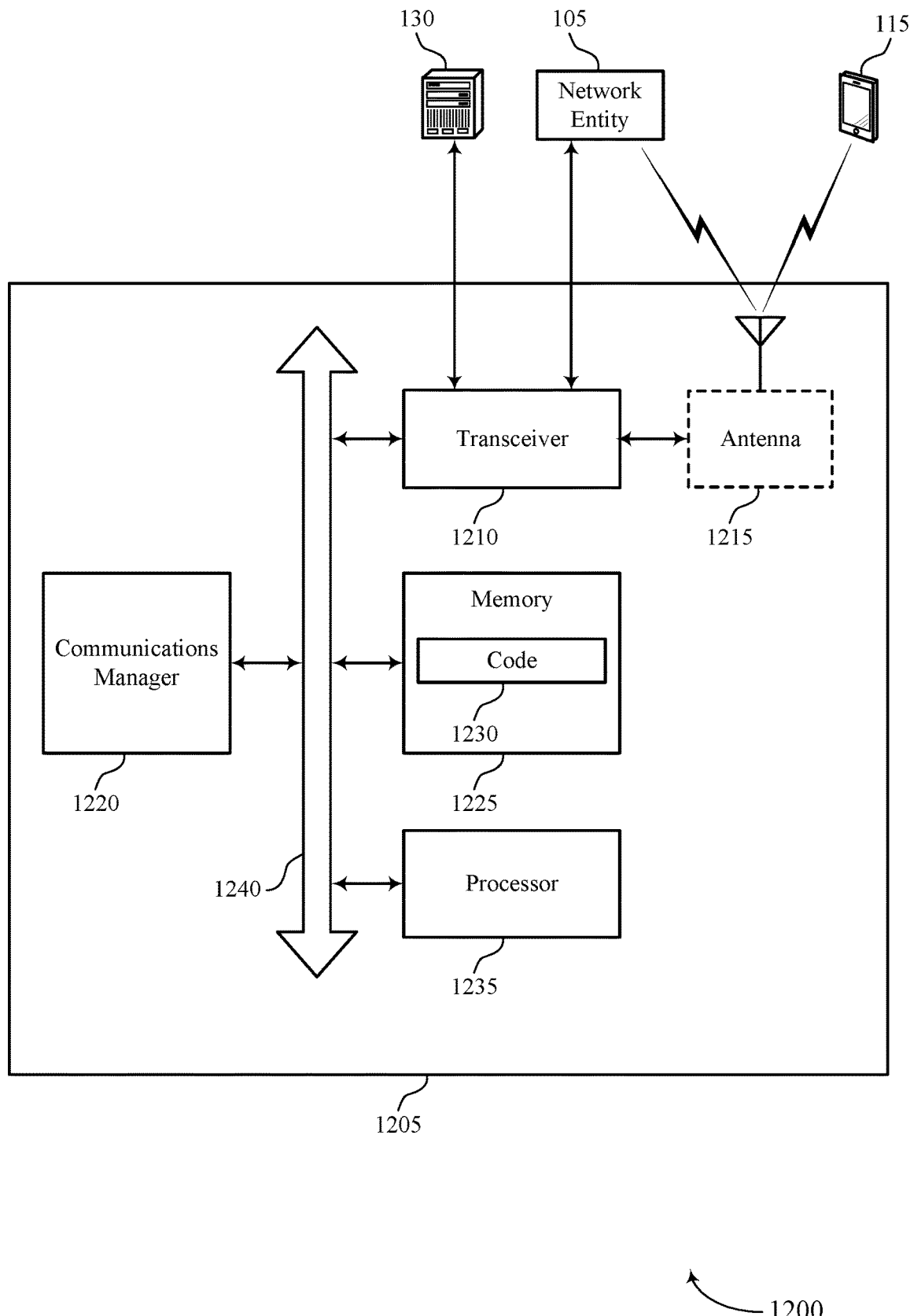
FIG. 12 shows a diagram of a system including a device that supports closed loop time and frequency corrections in non-terrestrial networks in accordance with one or more aspects of the present disclosure.

FIG. 12 shows a diagram of a system 1200 including a device 1205 that supports closed loop time and frequency corrections in non-terrestrial networks in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. The transceiver 1210, or the transceiver 1210 and one or more antennas 1215 or wired interfaces, where applicable, may be an example of a transmitter 915, a transmitter 1015, a receiver 910, a receiver 1010, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting closed loop time and frequency corrections in non-terrestrial networks). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links).

For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications at a network entity in accordance with examples as disclosed herein. For example, the communications manager 1220 may be configured as or otherwise support a means for establishing a communication session with a UE via a non-terrestrial network entity. The communications manager 1220 may be configured as or otherwise support a means for outputting, to the UE, control signaling identifying a preamble-specific time or frequency adjustment applicable to a transmission of a preamble of a random access procedure to be performed during the communication session. The communications manager 1220 may be configured as or otherwise support a means for receiving, from the UE during the communication session, the preamble of the random access procedure according to a total time or frequency adjustment value that is based on the preamble-specific time or frequency adjustment.

By including or configuring the communications manager 1220 in accordance with examples as described herein, the device 1205 may support techniques for more efficient utilization of communication resources and improved coordination between devices by applying more accurate timing or frequency adjustment values.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the processor 1235, the memory 1225, the code 1230, the transceiver 1210, or any combination thereof. For example, the code 1230 may include instructions executable by the processor 1235 to cause the device 1205 to perform various aspects of closed loop time and frequency corrections in non-terrestrial networks as described herein, or the processor 1235 and the memory 1225 may be otherwise configured to perform or support such operations.

Figure 13:
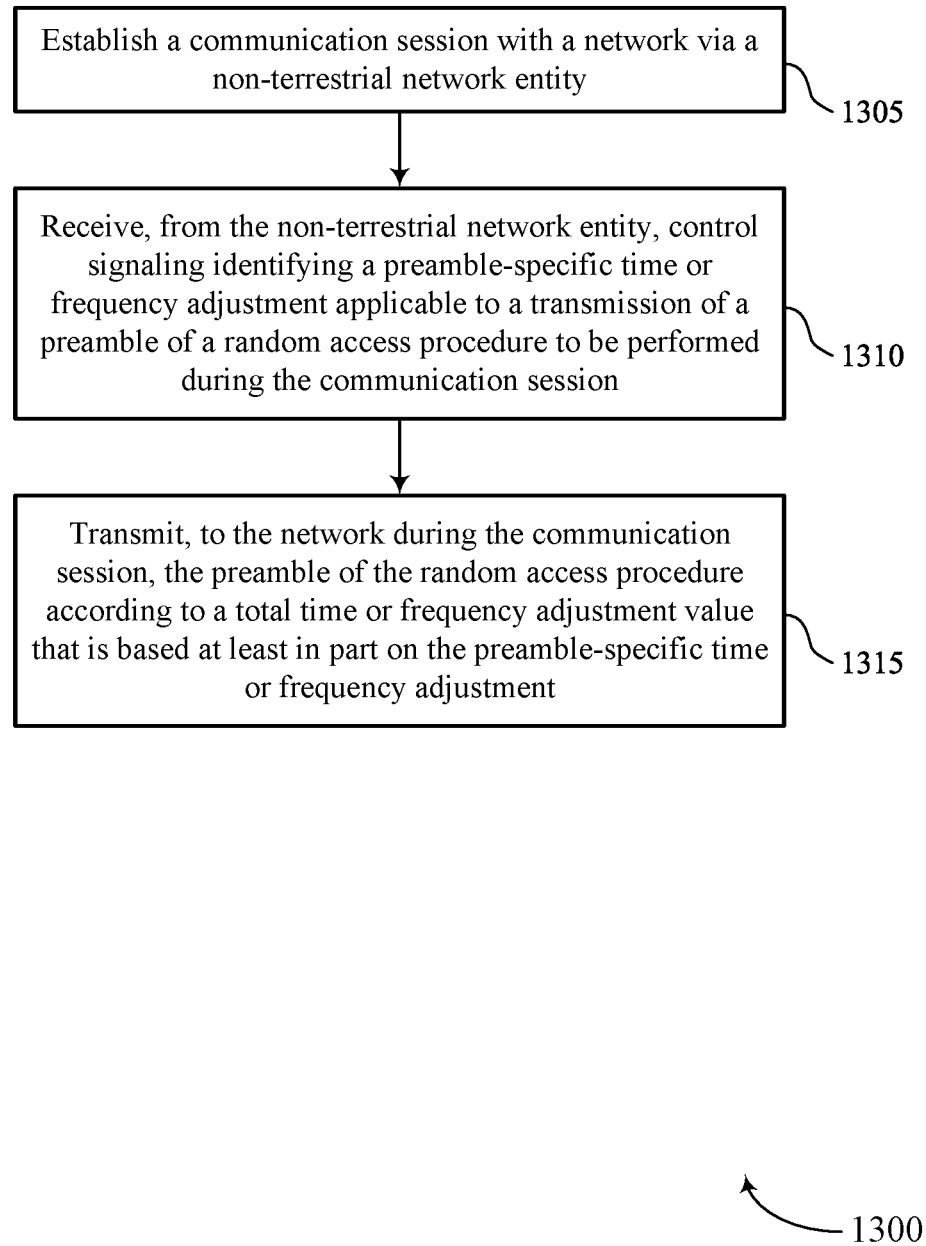
FIGS. 13 through 18 show flowcharts illustrating methods that support closed loop time and frequency corrections in non-terrestrial networks in accordance with one or more aspects of the present disclosure.

FIG. 13 shows a flowchart illustrating a method 1300 that supports closed loop time and frequency corrections in non-terrestrial networks in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include establishing a communication session with a network via a non-terrestrial network entity. The operations of 1305 may be performed in accordance with examples as disclosed herein. In some examples, aspects of the operations of 1305 may be performed by a communication session manager 725 as described with reference to FIG. 7.

At 1310, the method may include receiving, from the non-terrestrial network entity, control signaling identifying a preamble-specific time or frequency adjustment applicable to a transmission of a preamble of a random access procedure to be performed during the communication session. The operations of 1310 may be performed in accordance with examples as disclosed herein. In some examples, aspects of the operations of 1310 may be performed by a preamble-specific adjustment manager 730 as described with reference to FIG. 7.

At 1315, the method may include transmitting, to the network during the communication session, the preamble of the random access procedure according to a total time or frequency adjustment value that is based on the preamble-specific time or frequency adjustment. The operations of 1315 may be performed in accordance with examples as disclosed herein. In some examples, aspects of the operations of 1315 may be performed by a RACH preamble manager 735 as described with reference to FIG. 7.

Figure 14:
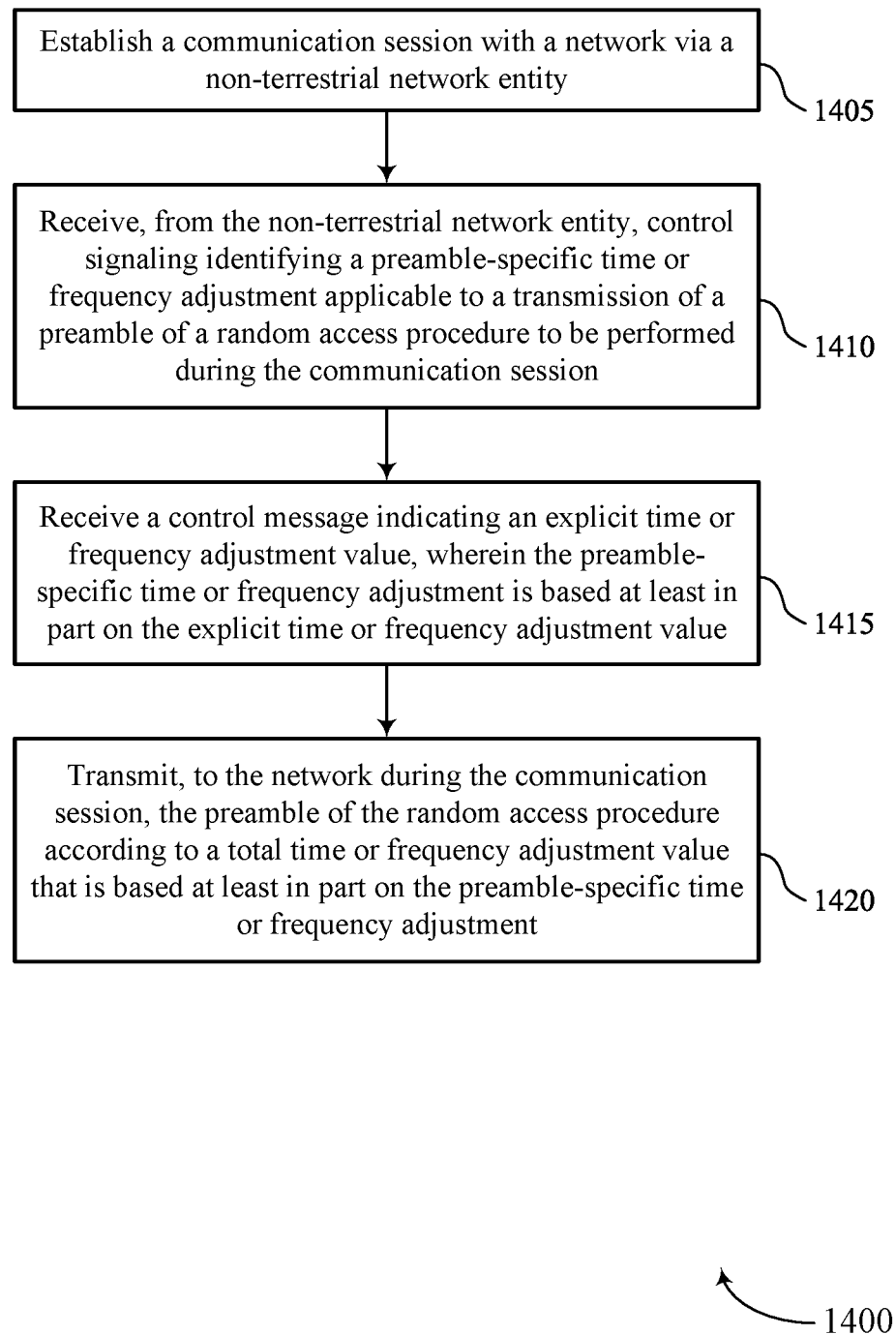

FIG. 14 shows a flowchart illustrating a method 1400 that supports closed loop time and frequency corrections in non-terrestrial networks in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include establishing a communication session with a network via a non-terrestrial network entity. The operations of 1405 may be performed in accordance with examples as disclosed herein. In some examples, aspects of the operations of 1405 may be performed by a communication session manager 725 as described with reference to FIG. 7.

At 1410, the method may include receiving, from the non-terrestrial network entity, control signaling identifying a preamble-specific time or frequency adjustment applicable to a transmission of a preamble of a random access procedure to be performed during the communication session. The operations of 1410 may be performed in accordance with examples as disclosed herein. In some examples, aspects of the operations of 1410 may be performed by a preamble-specific adjustment manager 730 as described with reference to FIG. 7.

At 1415, the method may include receiving a control message indicating an explicit time or frequency adjustment value, where the preamble-specific time or frequency adjustment is based on the explicit time or frequency adjustment value. The operations of 1415 may be performed in accordance with examples as disclosed herein. In some examples, aspects of the operations of 1415 may be performed by a time or frequency adjustment manager 740 as described with reference to FIG. 7.

At 1420, the method may include transmitting, to the network during the communication session, the preamble of the random access procedure according to a total time or frequency adjustment value that is based on the preamble-specific time or frequency adjustment. The operations of 1420 may be performed in accordance with examples as disclosed herein. In some examples, aspects of the operations of 1420 may be performed by a RACH preamble manager 735 as described with reference to FIG. 7.

Figure 15:
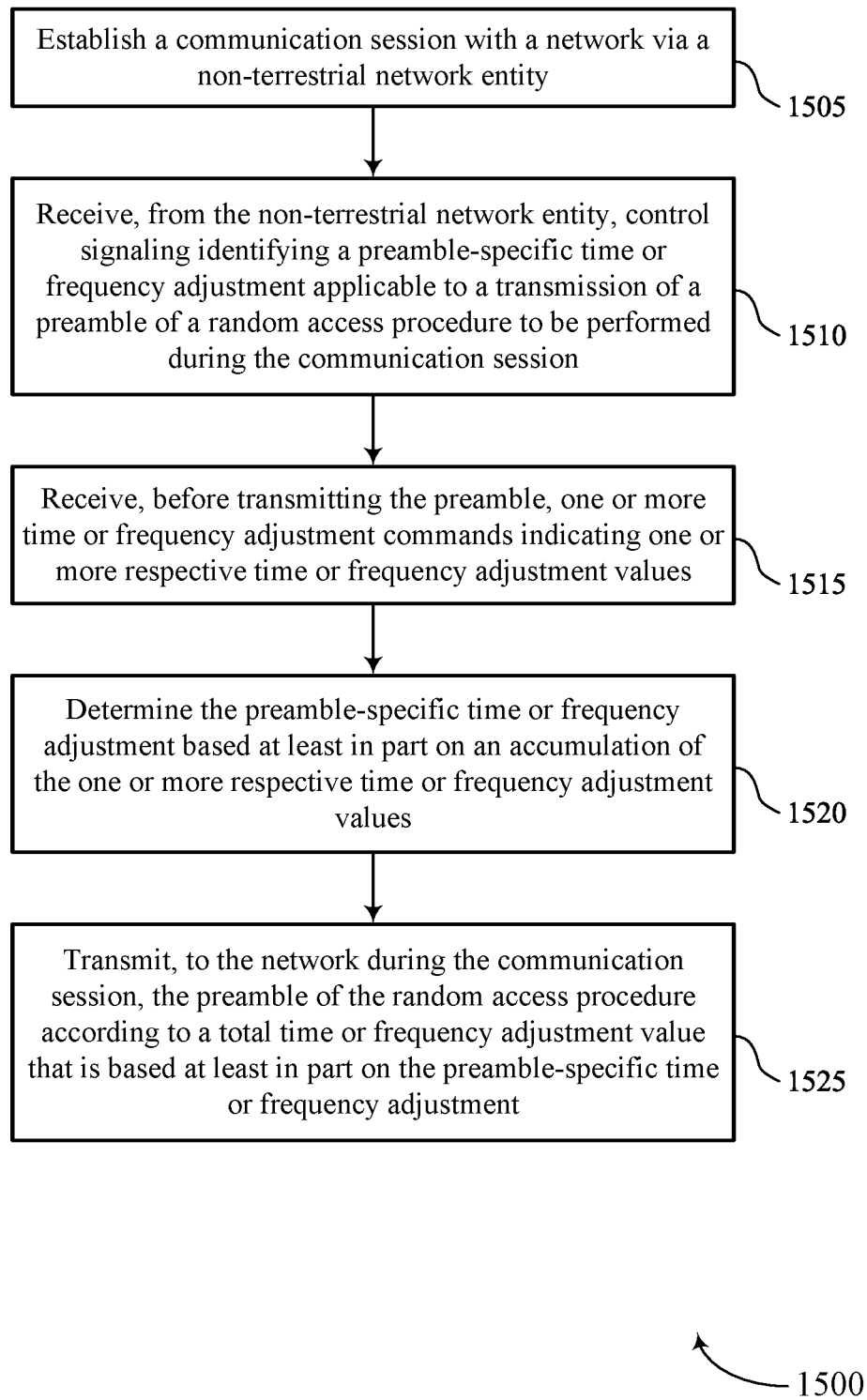

FIG. 15 shows a flowchart illustrating a method 1500 that supports closed loop time and frequency corrections in non-terrestrial networks in accordance with one or more aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include establishing a communication session with a network via a non-terrestrial network entity. The operations of 1505 may be performed in accordance with examples as disclosed herein. In some examples, aspects of the operations of 1505 may be performed by a communication session manager 725 as described with reference to FIG. 7.

At 1510, the method may include receiving, from the non-terrestrial network entity, control signaling identifying a preamble-specific time or frequency adjustment applicable to a transmission of a preamble of a random access procedure to be performed during the communication session. The operations of 1510 may be performed in accordance with examples as disclosed herein. In some examples, aspects of the operations of 1510 may be performed by a preamble-specific adjustment manager 730 as described with reference to FIG. 7.

At 1515, the method may include receiving, before transmitting the preamble, one or more time or frequency adjustment commands indicating one or more respective time or frequency adjustment values. The operations of 1515 may be performed in accordance with examples as disclosed herein. In some examples, aspects of the operations of 1515 may be performed by a time or frequency adjustment command manager 745 as described with reference to FIG. 7.

At 1520, the method may include determining the preamble-specific time or frequency adjustment based on an accumulation of the one or more respective time or frequency adjustment values. The operations of 1520 may be performed in accordance with examples as disclosed herein. In some examples, aspects of the operations of 1520 may be performed by a time or frequency adjustment accumulation manager 750 as described with reference to FIG. 7.

At 1525, the method may include transmitting, to the network during the communication session, the preamble of the random access procedure according to a total time or frequency adjustment value that is based on the preamble-specific time or frequency adjustment. The operations of 1525 may be performed in accordance with examples as disclosed herein. In some examples, aspects of the operations of 1525 may be performed by a RACH preamble manager 735 as described with reference to FIG. 7.

Figure 16:
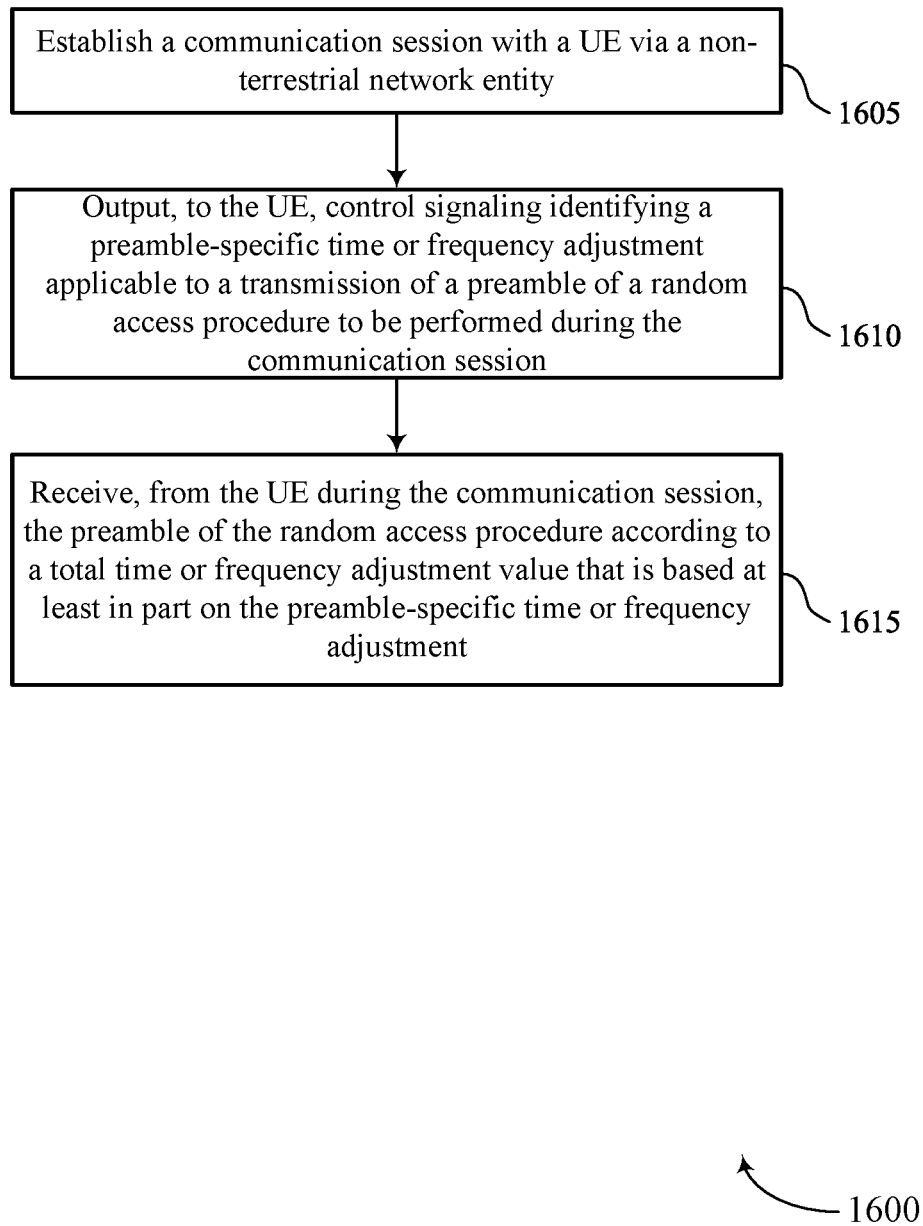

FIG. 16 shows a flowchart illustrating a method 1600 that supports closed loop time and frequency corrections in non-terrestrial networks in accordance with one or more aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include establishing a communication session with a UE via a non-terrestrial network entity. The operations of 1605 may be performed in accordance with examples as disclosed herein. In some examples, aspects of the operations of 1605 may be performed by a communication session manager 1125 as described with reference to FIG. 11.

At 1610, the method may include outputting, to the UE, control signaling identifying a preamble-specific time or frequency adjustment applicable to a transmission of a preamble of a random access procedure to be performed during the communication session. The operations of 1610 may be performed in accordance with examples as disclosed herein. In some examples, aspects of the operations of 1610 may be performed by a preamble-specific adjustment manager 1130 as described with reference to FIG. 11.

At 1615, the method may include receiving, from the UE during the communication session, the preamble of the random access procedure according to a total time or frequency adjustment value that is based on the preamble-specific time or frequency adjustment. The operations of 1615 may be performed in accordance with examples as disclosed herein. In some examples, aspects of the operations of 1615 may be performed by a RACH preamble manager 1135 as described with reference to FIG. 11.

Figure 17:
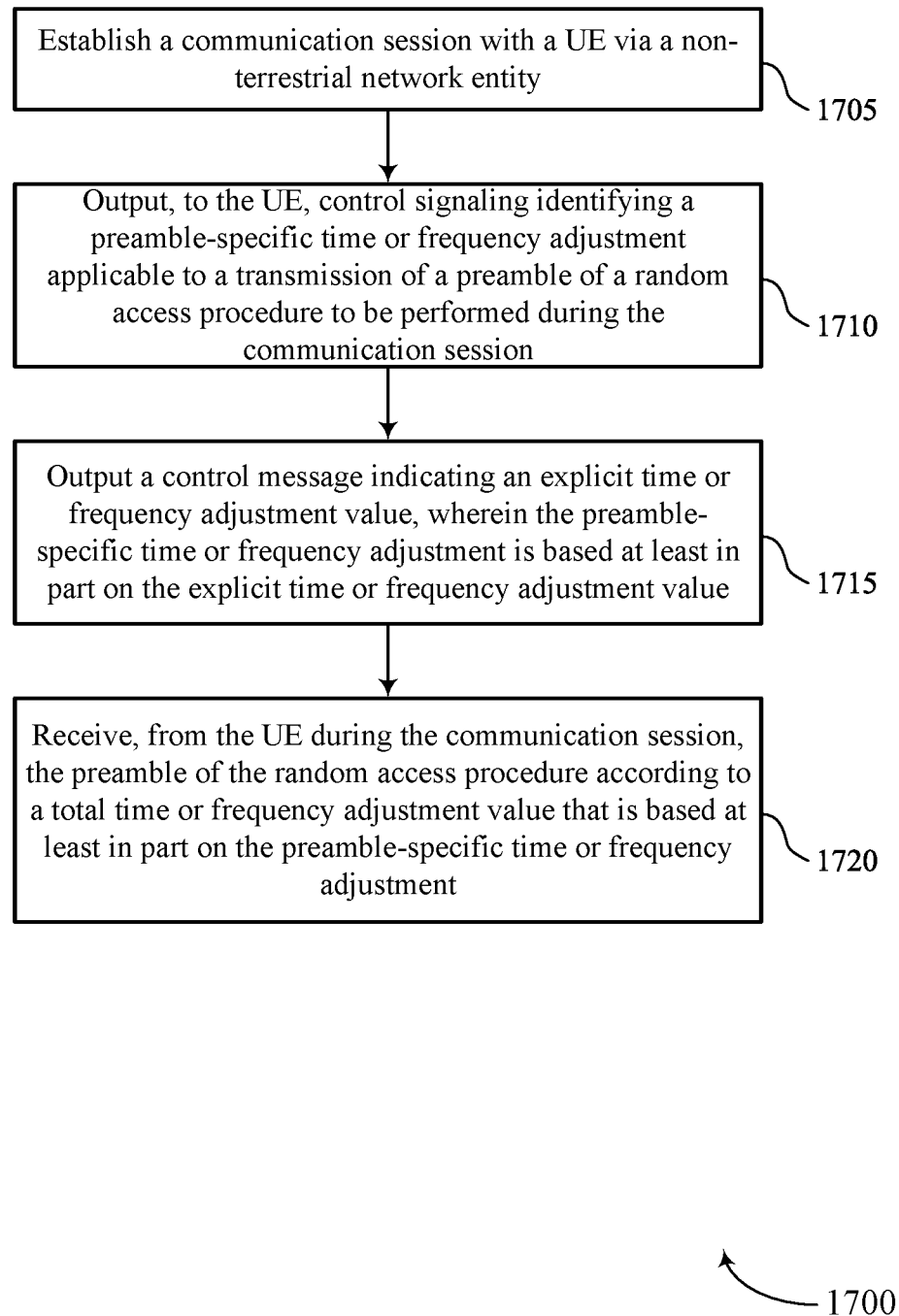

FIG. 17 shows a flowchart illustrating a method 1700 that supports closed loop time and frequency corrections in non-terrestrial networks in accordance with one or more aspects of the present disclosure. The operations of the method 1700 may be implemented by a network entity or its components as described herein. For example, the operations of the method 1700 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1705, the method may include establishing a communication session with a UE via a non-terrestrial network entity. The operations of 1705 may be performed in accordance with examples as disclosed herein. In some examples, aspects of the operations of 1705 may be performed by a communication session manager 1125 as described with reference to FIG. 11.

At 1710, the method may include outputting, to the UE, control signaling identifying a preamble-specific time or frequency adjustment applicable to a transmission of a preamble of a random access procedure to be performed during the communication session. The operations of 1710 may be performed in accordance with examples as disclosed herein. In some examples, aspects of the operations of 1710 may be performed by a preamble-specific adjustment manager 1130 as described with reference to FIG. 11.

At 1715, the method may include outputting a control message indicating an explicit time or frequency adjustment value, where the preamble-specific time or frequency adjustment is based on the explicit time or frequency adjustment value. The operations of 1715 may be performed in accordance with examples as disclosed herein. In some examples, aspects of the operations of 1715 may be performed by a time or frequency adjustment manager 1140 as described with reference to FIG. 11.

At 1720, the method may include receiving, from the UE during the communication session, the preamble of the random access procedure according to a total time or frequency adjustment value that is based on the preamble-specific time or frequency adjustment. The operations of 1720 may be performed in accordance with examples as disclosed herein. In some examples, aspects of the operations of 1720 may be performed by a RACH preamble manager 1135 as described with reference to FIG. 11.

Figure 18:
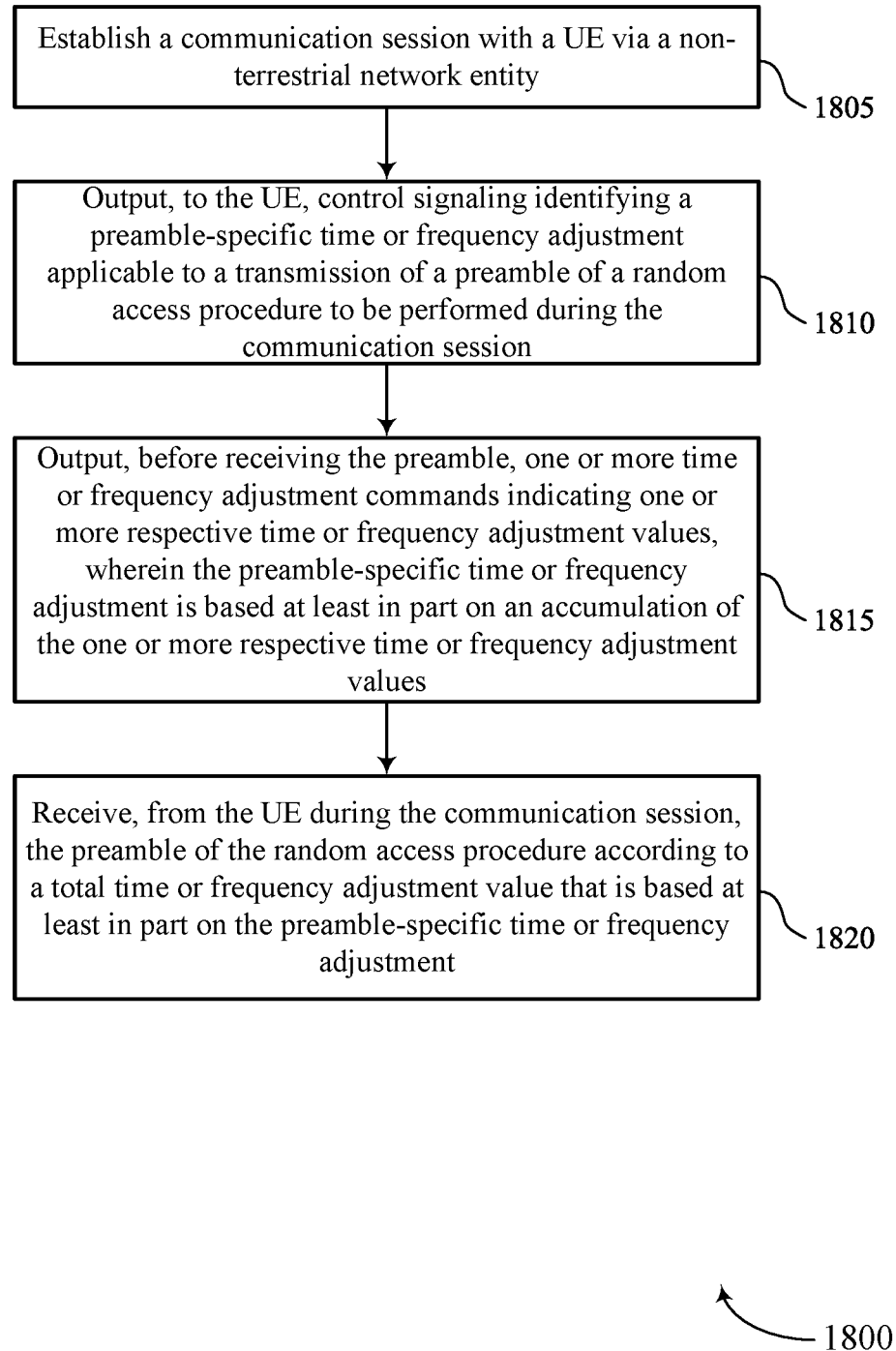

FIG. 18 shows a flowchart illustrating a method 1800 that supports closed loop time and frequency corrections in non-terrestrial networks in accordance with one or more aspects of the present disclosure. The operations of the method 1800 may be implemented by a network entity or its components as described herein. For example, the operations of the method 1800 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1805, the method may include establishing a communication session with a UE via a non-terrestrial network entity. The operations of 1805 may be performed in accordance with examples as disclosed herein. In some examples, aspects of the operations of 1805 may be performed by a communication session manager 1125 as described with reference to FIG. 11.

At 1810, the method may include outputting, to the UE, control signaling identifying a preamble-specific time or frequency adjustment applicable to a transmission of a preamble of a random access procedure to be performed during the communication session. The operations of 1810 may be performed in accordance with examples as disclosed herein. In some examples, aspects of the operations of 1810 may be performed by a preamble-specific adjustment manager 1130 as described with reference to FIG. 11.

At 1815, the method may include outputting, before receiving the preamble, one or more time or frequency adjustment commands indicating one or more respective time or frequency adjustment values, where the preamble-specific time or frequency adjustment is based on an accumulation of the one or more respective time or frequency adjustment values. The operations of 1815 may be performed in accordance with examples as disclosed herein. In some examples, aspects of the operations of 1815 may be performed by a time or frequency adjustment command manager 1145 as described with reference to FIG. 11.

At 1820, the method may include receiving, from the UE during the communication session, the preamble of the random access procedure according to a total time or frequency adjustment value that is based on the preamble-specific time or frequency adjustment. The operations of 1820 may be performed in accordance with examples as disclosed herein. In some examples, aspects of the operations of 1820 may be performed by a RACH preamble manager 1135 as described with reference to FIG. 11.

The following provides an overview of aspects of the present disclosure:

Aspect 1: A method for wireless communications at a UE, comprising: establishing a communication session with a network via a non-terrestrial network entity; receiving, from the non-terrestrial network entity, control signaling identifying a preamble-specific time or frequency adjustment applicable to a transmission of a preamble of a random access procedure to be performed during the communication session; and transmitting, to the network during the communication session, the preamble of the random access procedure according to a total time or frequency adjustment value that is based at least in part on the preamble-specific time or frequency adjustment.

Aspect 2: The method of aspect 1, wherein receiving the control signaling identifying the preamble-specific time or frequency adjustment comprises: receiving a control message indicating an explicit time or frequency adjustment value, wherein the preamble-specific time or frequency adjustment is based at least in part on the explicit time or frequency adjustment value.

Aspect 3: The method of any of aspects 1 through 2, wherein receiving the control signaling identifying the preamble-specific time or frequency adjustment comprises: receiving, before transmitting the preamble, one or more time or frequency adjustment commands indicating one or more respective time or frequency adjustment values; and determining the preamble-specific time or frequency adjustment based at least in part on an accumulation of the one or more respective time or frequency adjustment values.

Aspect 4: The method of aspect 3, further comprising: resetting the accumulation of the one or more respective time or frequency adjustment values to zero based at least in part on updated position information associated with the UE from a satellite positioning network, updated ephemeris information associated with the non-terrestrial network entity, or both.

Aspect 5: The method of any of aspects 3 through 4, further comprising: identifying a time or frequency adjustment parameter based at least in part on a first position of the UE and a second position of the non-terrestrial network entity, wherein the preamble-specific time or frequency adjustment is determined based at least in part on the time or frequency adjustment parameter and the accumulation.

Aspect 6: The method of any of aspects 1 through 5, wherein the total time or frequency adjustment value comprises a first time or frequency adjustment parameter that has a range of potential values based at least in part on zero or more time or frequency adjustment commands received from the non-terrestrial network entity and a second time or frequency adjustment parameter based at least in part on a first position of the UE and a second position of the non-terrestrial network entity, and the control signaling identifying the preamble-specific time or frequency adjustment comprises the first time or frequency adjustment parameter, the second time or frequency adjustment parameter, or any combination thereof.

Aspect 7: The method of any of aspects 1 through 6, wherein the total time or frequency adjustment value is based at least in part on a first time or frequency adjustment parameter that has a range of potential values based at least in part on zero or more time or frequency adjustment commands received from the non-terrestrial network entity prior to transmitting the preamble, a second time or frequency adjustment parameter based at least in part on a first position of the UE and a second position of the non-terrestrial network entity, and the preamble-specific time or frequency adjustment.

Aspect 8: The method of any of aspects 1 through 7, wherein receiving the control signaling identifying the preamble-specific time or frequency adjustment for the time or frequency adjustment comprises: receiving, before transmitting the preamble, a RAR message indicating a time or frequency adjustment parameter; and determining the preamble-specific time or frequency adjustment based at least in part on the time or frequency adjustment parameter.

Aspect 9: The method of any of aspects 1 through 8, further comprising: receiving control signaling indicating at least one of a first parameter identifying a timing or frequency adjustment offset or a second parameter identifying a timing or frequency adjustment for communications between a ground station and the non-terrestrial network entity, wherein the total time or frequency adjustment value comprises a total timing or frequency adjustment value that is based at least in part on the first parameter, the second parameter, and the preamble-specific time or frequency adjustment.

Aspect 10: The method of any of aspects 1 through 9, wherein receiving the control signaling identifying the preamble-specific time or frequency adjustment for the time or frequency adjustment comprises: receiving the control signaling identifying the preamble-specific time or frequency adjustment via a MAC-CE.

Aspect 11: The method of any of aspects 1 through 10, further comprising: receiving a control message indicating for the UE to perform the random access procedure, wherein the preamble of the random access procedure is transmitted at least in part in response to the received control message.

Aspect 12: The method of any of aspects 1 through 11, further comprising: receiving, from the network via the non-terrestrial network entity and after transmitting the preamble, control signaling indicating for the UE to acquire updated position information for the UE from a satellite positioning network, indicating for the UE to acquire updated ephemeris information associated with the non-terrestrial network entity, or both.

Aspect 13: The method of any of aspects 1 through 12, further comprising: acquiring updated position information for the UE from a satellite positioning network, updated ephemeris information associated with the non-terrestrial network entity, or both, based at least in part on the UE failing to receive a response to the transmitted preamble or one or more retransmissions of the preamble.

Aspect 14: The method of any of aspects 1 through 13, wherein a satellite comprises the non-terrestrial network entity.

Aspect 15: A method for wireless communications at a network entity, comprising: establishing a communication session with a UE via a non-terrestrial network entity; outputting, to the UE, control signaling identifying a preamble-specific time or frequency adjustment applicable to a transmission of a preamble of a random access procedure to be performed during the communication session; and receiving, from the UE during the communication session, the preamble of the random access procedure according to a total time or frequency adjustment value that is based at least in part on the preamble-specific time or frequency adjustment.

Aspect 16: The method of aspect 15, wherein outputting the preamble-specific time or frequency adjustment for the time or frequency adjustment comprises: outputting a control message indicating an explicit time or frequency adjustment value, wherein the preamble-specific time or frequency adjustment is based at least in part on the explicit time or frequency adjustment value.

Aspect 17: The method of any of aspects 15 through 16, wherein outputting the control signaling identifying the preamble-specific time or frequency adjustment for the time or frequency adjustment comprises: outputting, before receiving the preamble, one or more time or frequency adjustment commands indicating one or more respective time or frequency adjustment values, wherein the preamble-specific time or frequency adjustment is based at least in part on an accumulation of the one or more respective time or frequency adjustment values.

Aspect 18: The method of aspect 17, further comprising: identifying a time or frequency adjustment parameter based at least in part on a first position of the UE and a second position of the non-terrestrial network entity, wherein the preamble-specific time or frequency adjustment is determined based at least in part on the time or frequency adjustment parameter and the accumulation.

Aspect 19: The method of any of aspects 15 through 18, wherein the total time or frequency adjustment value comprises a first time or frequency adjustment parameter that has a range of potential values based at least in part on zero or more time or frequency adjustment commands output to the UE via the non-terrestrial network entity and a second time or frequency adjustment parameter based at least in part on a first position of the UE and a second position of the non-terrestrial network entity, and the preamble-specific time or frequency adjustment comprises the first time or frequency adjustment parameter, the second time or frequency adjustment parameter, or any combination thereof.

Aspect 20: The method of any of aspects 15 through 19, wherein the total time or frequency adjustment value is based at least in part on a first time or frequency adjustment parameter that has a range of potential values based at least in part on zero or more time or frequency adjustment commands output to the UE via the non-terrestrial network entity prior to receiving the preamble, a second time or frequency adjustment parameter based at least in part on a first position of the UE and a second position of the non-terrestrial network entity, and the preamble-specific time or frequency adjustment.

Aspect 21: The method of any of aspects 15 through 20, wherein outputting the control signaling identifying the preamble-specific time or frequency adjustment for the time or frequency adjustment comprises: outputting, before receiving the preamble, a RAR message indicating a time or frequency adjustment parameter, wherein the preamble-specific time or frequency adjustment is based at least in part on the time or frequency adjustment parameter.

Aspect 22: The method of any of aspects 15 through 21, further comprising: outputting, to the UE via the non-terrestrial network entity, control signaling indicating at least one of a first parameter identifying a timing or frequency adjustment offset or a second parameter identifying a timing or frequency adjustment for communications between a ground station and the non-terrestrial network entity, wherein the total time or frequency adjustment value comprises a total timing or frequency adjustment value that is based at least in part on the first parameter, the second parameter, and the preamble-specific time or frequency adjustment.

Aspect 23: The method of any of aspects 15 through 22, wherein outputting the control signaling identifying the preamble-specific time or frequency adjustment for the time or frequency adjustment comprises: outputting the control signaling identifying the preamble-specific time or frequency adjustment via a MAC-CE.

Aspect 24: The method of any of aspects 15 through 23, further comprising: outputting a control message indicating for the UE to perform the random access procedure, wherein the preamble of the random access procedure is received at least in part in response to the output control message.

Aspect 25: The method of any of aspects 15 through 24, further comprising: outputting, to the UE after receiving the preamble, control signaling indicating for the UE to acquire updated position information for the UE from a satellite positioning network, indicating for the UE to acquire updated ephemeris information associated with the non-terrestrial network entity, or both.

Aspect 26: The method of any of aspects 15 through 25, wherein a satellite comprises the non-terrestrial network entity, the network entity comprises the non-terrestrial network entity, a ground station comprises the network entity, or any combination thereof.

Aspect 27: An apparatus for wireless communications at a UE, comprising a processor; memory coupled with the processor; and instructions stored in the memory and executable by the processor to cause the apparatus to perform a method of any of aspects 1 through 14.

Aspect 28: An apparatus for wireless communications at a UE, comprising at least one means for performing a method of any of aspects 1 through 14.

Aspect 29: A non-transitory computer-readable medium storing code for wireless communications at a UE, the code comprising instructions executable by a processor to perform a method of any of aspects 1 through 14.

Aspect 30: An apparatus for wireless communications at a network entity, comprising a processor; memory coupled with the processor; and instructions stored in the memory and executable by the processor to cause the apparatus to perform a method of any of aspects 15 through 26.

Aspect 31: An apparatus for wireless communications at a network entity, comprising at least one means for performing a method of any of aspects 15 through 26.

Aspect 32: A non-transitory computer-readable medium storing code for wireless communications at a network entity, the code comprising instructions executable by a processor to perform a method of any of aspects 15 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    establishing a communication session with a network via a non-terrestrial network entity;
    transmitting, to the network during the communication session, one or more uplink data messages according to a first total time adjustment value in accordance with a total time adjustment formula, wherein the first total time adjustment value is based at least in part on a common time adjustment, an additional time adjustment that is based at least in part on a first position of the UE relative to the non-terrestrial network entity, and an accumulation value that is based at least in part on one or more time adjustment commands received from the non-terrestrial network entity during the communication session;
    receiving, from the non-terrestrial network entity, control signaling identifying a non-zero preamble-specific time adjustment applicable in place of the accumulation value for the total time adjustment formula for a transmission of a preamble of a random access procedure to be performed during the communication session; and
    transmitting, to the network during the communication session, the preamble of the random access procedure according to a second total time adjustment value in accordance with the total time adjustment formula, wherein the second total time adjustment value is based at least in part on the non-zero preamble-specific time adjustment, the common time adjustment, and the additional time adjustment that is based at least in part on the first position of the UE relative to the non-terrestrial network entity.

2. The method of claim 1, wherein receiving the control signaling identifying the non-zero preamble-specific time adjustment comprises:
    receiving a control message indicating an explicit time adjustment value, wherein non-zero preamble-specific time or frequency adjustment is based at least in part on the explicit time adjustment value.

3. The method of claim 1, wherein receiving the control signaling identifying the non-zero preamble-specific time adjustment comprises:
    receiving, before transmitting the preamble, the one or more time adjustment commands indicating one or more respective time adjustment values; and
    determining the non-zero preamble-specific time adjustment based at least in part on an accumulation of the one or more respective time adjustment values.

4. The method of claim 3, further comprising:
    resetting the accumulation of the one or more respective time adjustment values to zero based at least in part on updated position information associated with the UE from a satellite positioning network, updated ephemeris information associated with the non-terrestrial network entity, or both.

5. The method of claim 3, further comprising:
    identifying a time adjustment parameter based at least in part on the first position of the UE and a second position of the non-terrestrial network entity, wherein the non-zero preamble-specific time adjustment is determined based at least in part on the time adjustment parameter and the accumulation.

6. The method of claim 1, wherein the second total time adjustment value comprises a first time adjustment parameter that has a range of potential values based at least in part on zero or more time adjustment commands received from the non-terrestrial network entity and a second time adjustment parameter based at least in part on the first position of the UE and a second position of the non-terrestrial network entity, and the control signaling identifying the non-zero preamble-specific time adjustment comprises the first time adjustment parameter, the second time adjustment parameter, or any combination thereof.

7. The method of claim 1, wherein the second total time adjustment value is based at least in part on a first time adjustment parameter that has a range of potential values based at least in part on zero or more time adjustment commands received from the non-terrestrial network entity prior to transmitting the preamble, a second time adjustment parameter based at least in part on the first position of the UE and a second position of the non-terrestrial network entity, and the non-zero preamble-specific time adjustment.

8. The method of claim 1, wherein receiving the control signaling identifying the non-zero preamble-specific time adjustment comprises:
    receiving, before transmitting the preamble, a random access response message indicating a time adjustment parameter; and determining the non-zero preamble-specific time adjustment based at least in part on the time adjustment parameter.

9. The method of claim 1, further comprising:
receiving the control signaling indicating at least one of a first parameter identifying a timing adjustment offset or a second parameter identifying a timing adjustment for communications between a ground station and the non-terrestrial network entity, wherein the second total time adjustment value comprises a total timing adjustment value that is based at least in part on the first parameter, the second parameter, and the non-zero preamble-specific time adjustment.

10. The method of claim 1, wherein receiving the control signaling identifying the non-zero preamble-specific time adjustment comprises:
receiving the control signaling identifying the non-zero preamble-specific time adjustment via a medium access control (MAC) control element.

11. The method of claim 1, further comprising:
receiving a control message indicating for the UE to perform the random access procedure, wherein the preamble of the random access procedure is transmitted at least in part in response to the received control message.

12. The method of claim 1, further comprising:
receiving, from the network via the non-terrestrial network entity and after transmitting the preamble, second control signaling indicating for the UE to acquire updated position information for the UE from a satellite positioning network, indicating for the UE to acquire updated ephemeris information associated with the non-terrestrial network entity, or both.

13. The method of claim 1, further comprising:
acquiring updated position information for the UE from a satellite positioning network, updated ephemeris information associated with the non-terrestrial network entity, or both, based at least in part on the UE failing to receive a response to the transmitted preamble or one or more retransmissions of the preamble.

14. The method of claim 1, wherein a satellite comprises the non-terrestrial network entity.

15. A method for wireless communications at a network entity, comprising:
establishing a communication session with a user equipment (UE) via a non-terrestrial network entity;
receiving, from the UE during the communication session, one or more uplink data messages according to a first total time adjustment value in accordance with a total time adjustment formula, wherein the first total time adjustment value is based at least in part on a common time adjustment, an additional time adjustment that is based at least in part on a first position of the UE relative to the non-terrestrial network entity, and an accumulation value that is based at least in part on one or more time adjustment commands received from the non-terrestrial network entity during the communication session;
outputting, to the UE, control signaling identifying a non-zero preamble-specific time or frequency adjustment applicable in place of the accumulation value for the total time adjustment formula for a transmission of a preamble of a random access procedure to be performed during the communication session; and
receiving, from the UE during the communication session, the preamble of the random access procedure according to a second total time adjustment value in accordance with the total time adjustment formula, wherein the second total time adjustment value is based at least in part on the non-zero preamble-specific time adjustment, the common time adjustment, and the additional time adjustment that is based at least in part on the first position of the UE relative to the non-terrestrial network entity.

16. The method of claim 15, wherein outputting the non-zero preamble-specific time adjustment comprises:
outputting a control message indicating an explicit time adjustment value, wherein the non-zero preamble-specific time adjustment is based at least in part on the explicit time adjustment value.

17. The method of claim 15, wherein outputting the control signaling identifying the non-zero preamble-specific time adjustment comprises:
outputting, before receiving the preamble, the one or more time adjustment commands indicating one or more respective time adjustment values, wherein the non-zero preamble-specific time adjustment is based at least in part on an accumulation of the one or more respective time adjustment values.

18. The method of claim 17, further comprising:
identifying a time adjustment parameter based at least in part on the first position of the UE and a second position of the non-terrestrial network entity, wherein the non-zero preamble-specific time adjustment is determined based at least in part on the time adjustment parameter and the accumulation.

19. The method of claim 15, wherein the second total time adjustment value comprises a first time adjustment parameter that has a range of potential values based at least in part on zero or more time adjustment commands output to the UE via the non-terrestrial network entity and a second time adjustment parameter based at least in part on the first position of the UE and a second position of the non-terrestrial network entity, and the non-zero preamble-specific time adjustment comprises the first time adjustment parameter, the second time adjustment parameter, or any combination thereof.

20. The method of claim 15, wherein the second total time adjustment value is based at least in part on a first time adjustment parameter that has a range of potential values based at least in part on zero or more time adjustment commands output to the UE via the non-terrestrial network entity prior to receiving the preamble, a second time adjustment parameter based at least in part on the first position of the UE and a second position of the non-terrestrial network entity, and the non-zero preamble-specific time adjustment.

21. The method of claim 15, wherein outputting the control signaling identifying the non-zero preamble-specific time adjustment comprises:
outputting, before receiving the preamble, a random access response message indicating a time adjustment parameter, wherein the non-zero preamble-specific time adjustment is based at least in part on the time adjustment parameter.

22. The method of claim 15, further comprising:
outputting, to the UE via the non-terrestrial network entity, the control signaling indicating at least one of a first parameter identifying a timing adjustment offset or a second parameter identifying a timing adjustment for communications between a ground station and the non-terrestrial network entity, wherein the second total time adjustment value comprises a total timing adjustment value that is based at least in part on the first parameter, the second parameter, and the non-zero preamble-specific time adjustment.

23. The method of claim 15, wherein outputting the control signaling identifying the non-zero preamble-specific time adjustment comprises:
outputting the control signaling identifying the non-zero preamble-specific time or frequency adjustment via a medium access control (MAC) control element.

24. The method of claim 15, further comprising:
outputting a control message indicating for the UE to perform the random access procedure, wherein the preamble of the random access procedure is received at least in part in response to the output control message.

25. The method of claim 15, further comprising:
outputting, to the UE after receiving the preamble, second control signaling indicating for the UE to acquire updated position information for the UE from a satellite positioning network, indicating for the UE to acquire updated ephemeris information associated with the non-terrestrial network entity, or both.

26. The method of claim 15, wherein a satellite comprises the non-terrestrial network entity, the network entity comprises the non-terrestrial network entity, a ground station comprises the network entity, or any combination thereof.

27. An apparatus for wireless communications at a user equipment (UE), comprising:
one or more processors;
memory coupled with the one or more processors; and
instructions stored in the memory and executable by the one or more processors to cause the apparatus to:
establish a communication session with a network via a non-terrestrial network entity;
transmit, to the network during the communication session, one or more uplink data messages according to a first total time adjustment value in accordance with a total time adjustment formula, wherein the first total time adjustment value is based at least in part on a common time adjustment, an additional time adjustment that is based at least in part on a first position of the UE relative to the non-terrestrial network entity, and an accumulation value that is based at least in part on one or more time adjustment commands received from the non-terrestrial network entity during the communication session;
receive, from the non-terrestrial network entity, control signaling identifying a non-zero preamble-specific time adjustment applicable in place of the accumulation value for the total time adjustment formula for a transmission of a preamble of a random access procedure to be performed during the communication session; and
transmit, to the network during the communication session, the preamble of the random access procedure according to a second total time adjustment value in accordance with the total time adjustment formula, wherein the second total time adjustment value is based at least in part on the non-zero preamble-specific time adjustment, the common time adjustment, and the additional time adjustment that is based at least in part on the first position of the UE relative to the non-terrestrial network entity.

28. The apparatus of claim 27, wherein the instructions to receive the control signaling identifying the non-zero preamble-specific time adjustment are executable by the one or more processors to cause the apparatus to:
receive a control message indicating an explicit time adjustment value, wherein the non-zero preamble-specific time adjustment is based at least in part on the explicit time adjustment value.

29. The apparatus of claim 27, wherein the instructions to receive the control signaling identifying the non-zero preamble-specific time adjustment are executable by the one or more processors to cause the apparatus to:
receive, before transmitting the preamble, the one or more time adjustment commands indicating one or more respective time adjustment values; and
determine the non-zero preamble-specific time adjustment based at least in part on an accumulation of the one or more respective time adjustment values.

30. An apparatus for wireless communications at a network entity, comprising:
one or more processors;
memory coupled with the one or more processors; and
instructions stored in the memory and executable by the one or more processors to cause the apparatus to:
establish a communication session with a user equipment (UE) via a non-terrestrial network entity;
receive, from the UE during the communication session, one or more uplink data messages according to a first total time adjustment value in accordance with a total time adjustment formula, wherein the first total time adjustment value is based at least in part on a common time adjustment, an additional time adjustment that is based at least in part on a first position of the UE relative to the non-terrestrial network entity, and an accumulation value that is based at least in part on one or more time adjustment commands received from the non-terrestrial network entity during the communication session;
output, to the UE, control signaling identifying a non-zero preamble-specific time adjustment applicable in place of the accumulation value for the total time adjustment formula for a transmission of a preamble of a random access procedure to be performed during the communication session; and
receive, from the UE during the communication session, the preamble of the random access procedure according to a second total time adjustment value in accordance with the total time adjustment formula, wherein the second total time adjustment value is based at least in part on the non-zero preamble-specific time adjustment, the common time adjustment, and the additional time adjustment that is based at least in part on the first position of the UE relative to the non-terrestrial network entity.

* * * * *